(12) United States Patent
VanDaalwyk et al.

(10) Patent No.: US 11,077,509 B2
(45) Date of Patent: Aug. 3, 2021

(54) PIPE THREADER

(71) Applicant: MILWAUKEE ELECTRIC TOOL CORPORATION, Brookfield, WI (US)

(72) Inventors: Brett J. VanDaalwyk, Milwaukee, WI (US); Kegan Markwardt, West Allis, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/288,160

(22) Filed: Feb. 28, 2019

(65) Prior Publication Data
US 2019/0283157 A1   Sep. 19, 2019

Related U.S. Application Data

(60) Provisional application No. 62/780,463, filed on Dec. 17, 2018, provisional application No. 62/719,860, filed on Aug. 20, 2018, provisional application No. 62/683,307, filed on Jun. 11, 2018, provisional application No. 62/644,072, filed on Mar. 16, 2018.

(51) Int. Cl.
  *B23G 1/24*   (2006.01)
(52) U.S. Cl.
  CPC ..................................... *B23G 1/24* (2013.01)
(58) Field of Classification Search
  CPC ... B23G 1/24; B23G 1/52; B23G 1/46; B23G 1/22; Y10T 82/22; B23B 2231/54
  See application file for complete search history.

(56) References Cited

U.S. PATENT DOCUMENTS

| 1,674,371 A | 6/1928 | Nonneman |
| 1,686,661 A | 10/1928 | Himes |
| 1,692,487 A | 11/1928 | Connell |

(Continued)

FOREIGN PATENT DOCUMENTS

| CN | 2056881 U | 5/1990 |
| CN | 2065527 U | 11/1990 |

(Continued)

OTHER PUBLICATIONS

International Search Report and Written Opinion for Application No. PCT/US2019/019926, dated Jul. 9, 2019, 15 pages.

*Primary Examiner* — Eric A. Gates
*Assistant Examiner* — Paul M Janeski
(74) *Attorney, Agent, or Firm* — Michael Best & Friedrich LLP

(57) ABSTRACT

A pipe threader comprises a housing and a drive assembly including a motor and an output gear having a first plurality of teeth. A die holder defines a rotational axis and includes a gear member including an outer circumference with a second plurality of teeth engaged with the output gear. The gear member includes an inner circumference with a key recess. A lock ring is rotatable relative to the gear member and including a contact surface. A key is arranged in the key recess and a biasing member in the key recess and biasing the key toward the rotational axis. The lock ring is movable between a locked position, in which the contact surface inhibits the key from moving away from the rotational axis, and an unlocked position, in which the key is movable away from the rotational axis in response to insertion of a die into the die holder.

20 Claims, 22 Drawing Sheets

(56) References Cited

U.S. PATENT DOCUMENTS

| | | |
|---|---|---|
| 1,707,456 A | 4/1929 | Bourne |
| 1,789,411 A | 1/1931 | Oster et al. |
| 1,789,412 A | 1/1931 | Oster et al. |
| 1,796,333 A | 3/1931 | Johnson |
| 1,851,367 A | 3/1932 | Mikaelson |
| 1,857,251 A | 5/1932 | Mikaelson |
| 1,936,274 A | 11/1933 | Shafer |
| 2,046,014 A | 6/1936 | Breitenstein |
| 2,100,376 A | 11/1937 | Breitenstein |
| 2,196,897 A | 4/1940 | Emery |
| 2,205,148 A | 6/1940 | Mayotte |
| 2,210,531 A | 8/1940 | Engelbaugh et al. |
| 2,213,379 A | 9/1940 | Bird et al. |
| 2,219,944 A | 10/1940 | Schoepe |
| 2,228,964 A | 1/1941 | Metz |
| 2,278,768 A | 4/1942 | Calvert |
| 2,323,970 A | 7/1943 | Bird et al. |
| 2,389,857 A | 11/1945 | Kayfetz |
| 2,534,878 A | 12/1950 | Packer |
| 2,551,517 A | 5/1951 | Webb |
| 2,567,784 A | 9/1951 | Ridgeway |
| 2,574,260 A | 11/1951 | Griffith |
| 2,600,776 A | 6/1952 | Ingwer |
| 2,614,435 A | 10/1952 | Chasar |
| 2,631,308 A | 3/1953 | Hutchinson |
| 2,634,437 A | 4/1953 | Farmer |
| 2,678,453 A | 5/1954 | Rudolph |
| 2,680,256 A | 6/1954 | Ingwer et al. |
| 2,680,861 A | 6/1954 | Ingwer et al. |
| 2,685,095 A | 8/1954 | Butler |
| 2,694,815 A | 11/1954 | Barnes |
| 2,710,979 A | 6/1955 | Strickland |
| 2,744,757 A | 5/1956 | Chasar |
| 2,751,614 A * | 6/1956 | Bourguignon ........... B23G 1/46 408/173 |
| 2,753,575 A | 7/1956 | Ingwer et al. |
| 2,768,550 A | 10/1956 | Ingwer et al. |
| 2,770,820 A | 11/1956 | Wiegel et al. |
| 2,810,141 A | 10/1957 | Langston |
| 2,858,553 A | 11/1958 | Bearhalter |
| 2,887,886 A | 5/1959 | Chasar et al. |
| 2,916,749 A | 12/1959 | Ingwer et al. |
| 2,919,092 A | 12/1959 | Chasar et al. |
| 3,002,205 A | 10/1961 | Buyer |
| 3,009,178 A | 11/1961 | Buyer |
| 3,082,445 A | 3/1963 | Buyer |
| 3,095,772 A | 7/1963 | Ingwer |
| 3,128,482 A | 4/1964 | McConnell |
| 3,159,857 A | 12/1964 | McConnell |
| 3,163,082 A | 12/1964 | Key |
| 3,165,768 A | 1/1965 | Herbkersman |
| 3,241,847 A | 3/1966 | McConnell |
| 3,276,051 A | 10/1966 | Strickland |
| 3,316,571 A | 5/1967 | Cutrone |
| 3,398,966 A | 8/1968 | Chalfant et al. |
| 3,413,667 A | 12/1968 | Behnke |
| 3,427,672 A | 2/1969 | Frank |
| 3,445,871 A | 5/1969 | Blake |
| 3,499,178 A | 3/1970 | Blake |
| 3,521,313 A | 7/1970 | Baker |
| 3,562,827 A | 2/1971 | Janik |
| 3,580,690 A | 5/1971 | McClure |
| 3,599,260 A | 8/1971 | Lesh |
| 3,659,482 A | 5/1972 | Blake |
| 3,720,992 A | 3/1973 | Hyatt |
| 3,829,920 A | 8/1974 | Theuerkauf |
| 3,864,774 A | 2/1975 | Fohl |
| 4,019,400 A | 4/1977 | Stump |
| 4,025,219 A | 5/1977 | Baumann et al. |
| 4,063,600 A | 12/1977 | Krzes |
| 4,068,977 A | 1/1978 | Rossetti |
| 4,209,274 A | 6/1980 | Martin et al. |
| 4,247,124 A | 1/1981 | Wagner |
| 4,353,154 A | 10/1982 | Wagner |
| 4,426,178 A | 1/1984 | Wüchner |
| 4,497,100 A | 2/1985 | Wagner |
| 4,502,821 A | 3/1985 | Wagner |
| 4,613,260 A | 9/1986 | Hayes et al. |
| 4,638,870 A | 1/1987 | Kousek |
| 4,753,143 A | 6/1988 | Mynhier |
| 4,757,598 A | 7/1988 | Redman |
| 4,780,031 A | 10/1988 | Ollacarizqueta |
| 4,787,531 A | 11/1988 | Gress |
| 4,811,639 A | 3/1989 | Gress et al. |
| 4,819,527 A | 4/1989 | Redman |
| 4,854,200 A | 8/1989 | Mynhier |
| 4,885,963 A | 12/1989 | Nishikawa |
| 5,002,440 A | 3/1991 | Tamaoki et al. |
| 5,074,176 A | 12/1991 | Redman et al. |
| 5,199,928 A | 4/1993 | Gress et al. |
| 5,401,124 A | 3/1995 | Hettich |
| 5,560,582 A | 10/1996 | Beelen |
| 5,826,469 A | 10/1998 | Haradem |
| 5,879,111 A | 3/1999 | Stöck et al. |
| 5,954,457 A | 9/1999 | Stöck et al. |
| 5,996,707 A | 12/1999 | Thome et al. |
| 6,981,557 B2 | 1/2006 | Boeni et al. |
| 7,011,165 B2 | 3/2006 | Kristen et al. |
| 7,055,620 B2 | 6/2006 | Nadig et al. |
| 7,306,046 B2 | 12/2007 | Meixner et al. |
| 7,410,006 B2 | 8/2008 | Zhang et al. |
| 7,552,781 B2 | 6/2009 | Zhang et al. |
| 7,628,219 B2 | 12/2009 | Frauhammer et al. |
| RE44,311 E | 6/2013 | Zhang et al. |
| 8,555,997 B2 | 10/2013 | Carrier et al. |
| 8,727,034 B2 | 5/2014 | Leong et al. |
| RE44,993 E | 7/2014 | Vanko et al. |
| RE45,112 E | 9/2014 | Zhang et al. |
| 8,833,484 B2 | 9/2014 | Binder et al. |
| 9,095,917 B2 | 8/2015 | Patil et al. |
| 9,138,818 B2 | 9/2015 | Kundracik et al. |
| 9,144,875 B2 | 9/2015 | Schlesak et al. |
| 9,370,835 B2 | 6/2016 | Kundracik et al. |
| 9,434,038 B2 | 9/2016 | Elger |
| 9,962,807 B2 | 5/2018 | Klee et al. |
| 2003/0156913 A1 | 8/2003 | Willis |
| 2004/0011632 A1 | 1/2004 | Hellmann et al. |
| 2009/0308209 A1 | 12/2009 | Cross et al. |
| 2010/0269649 A1 | 10/2010 | Rantz |
| 2014/0037394 A1 | 2/2014 | Patil et al. |
| 2015/0165534 A1 | 6/2015 | Hamm |
| 2015/0343543 A1 | 12/2015 | Kundracik et al. |
| 2016/0256943 A1 | 9/2016 | Kundracik et al. |
| 2017/0100791 A1 | 4/2017 | Hamm et al. |
| 2017/0197265 A1 | 7/2017 | Hamm et al. |
| 2018/0043521 A1 | 2/2018 | Moessnang et al. |

FOREIGN PATENT DOCUMENTS

| | | |
|---|---|---|
| CN | 2083092 U | 8/1991 |
| CN | 2136709 Y | 6/1993 |
| CN | 2193218 Y | 3/1995 |
| CN | 2194234 Y | 4/1995 |
| CN | 2197160 Y | 5/1995 |
| CN | 2236380 Y | 10/1996 |
| CN | 2238696 Y | 10/1996 |
| CN | 2238697 Y | 10/1996 |
| CN | 2240409 Y | 11/1996 |
| CN | 1171512 A | 1/1998 |
| CN | 2301286 Y | 12/1998 |
| CN | 2302082 Y | 12/1998 |
| CN | 2429287 Y | 5/2001 |
| CN | 2440613 Y | 8/2001 |
| CN | 2486262 Y | 4/2002 |
| CN | 201023193 Y | 2/2008 |
| CN | 201244688 Y | 5/2009 |
| CN | 201244689 Y | 5/2009 |
| CN | 101704141 A | 5/2010 |
| CN | 201483096 U | 5/2010 |
| CN | 201500832 U | 6/2010 |
| CN | 101862869 A | 10/2010 |
| CN | 101870014 A | 10/2010 |
| CN | 101870016 A | 10/2010 |
| CN | 201644960 U | 11/2010 |

(56) References Cited

FOREIGN PATENT DOCUMENTS

| | | |
|---|---|---|
| CN | 201702474 U | 1/2011 |
| CN | 201702478 U | 1/2011 |
| CN | 201744755 U | 2/2011 |
| CN | 201792058 U | 4/2011 |
| CN | 201997816 U | 10/2011 |
| CN | 202388074 U | 8/2012 |
| CN | 202479634 U | 10/2012 |
| CN | 202845965 U | 4/2013 |
| CN | 103506712 A | 1/2014 |
| CN | 203541767 U | 4/2014 |
| CN | 203817544 U | 9/2014 |
| CN | 204035722 U | 12/2014 |
| CN | 104588792 A | 5/2015 |
| CN | 204430474 U | 7/2015 |
| CN | 204843173 U | 12/2015 |
| CN | 105290528 A | 2/2016 |
| CN | 106077845 A | 11/2016 |
| CN | 106217092 A | 12/2016 |
| CN | 106735627 A | 5/2017 |
| CN | 206455252 U | 9/2017 |
| CN | 206509598 U | 9/2017 |
| CN | 207104025 U | 3/2018 |
| DE | 364641 C | 11/1922 |
| DE | 444086 C | 10/1927 |
| DE | 472021 C | 2/1929 |
| DE | 469963 C | 3/1929 |
| DE | 525357 C | 5/1931 |
| DE | 2505096 A1 | 8/1976 |
| DE | 7821015 U1 | 10/1978 |
| DE | 2756951 A1 | 6/1979 |
| DE | 2943989 A1 | 5/1981 |
| DE | 8436958 U1 | 3/1985 |
| DE | 8234821 U1 | 5/1985 |
| DE | 3616644 A1 | 6/1987 |
| DE | 8809119 U1 | 9/1988 |
| DE | 3824115 A1 | 11/1989 |
| DE | 4231975 A1 | 4/1993 |
| DE | 4306023 A1 | 7/1993 |
| DE | 4428049 A1 | 2/1996 |
| DE | 29707468 U1 | 6/1997 |
| DE | 102016203925 A1 | 9/2017 |
| EP | 263771 A1 | 4/1988 |
| EP | 0291439 A2 | 11/1988 |
| EP | 875327 A2 | 11/1998 |
| EP | 1398119 B1 | 4/2010 |
| EP | 2769794 B1 | 3/2017 |
| EP | 3050676 B1 | 9/2017 |
| GB | 191512817 A | 9/1916 |
| GB | 178877 A | 4/1922 |
| GB | 616576 A | 1/1949 |

\* cited by examiner

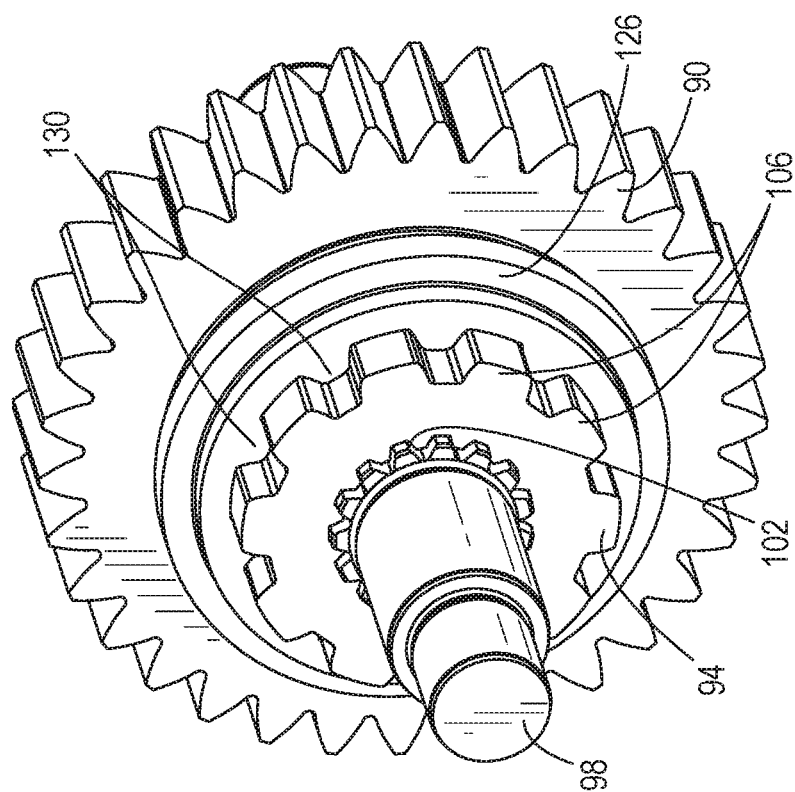
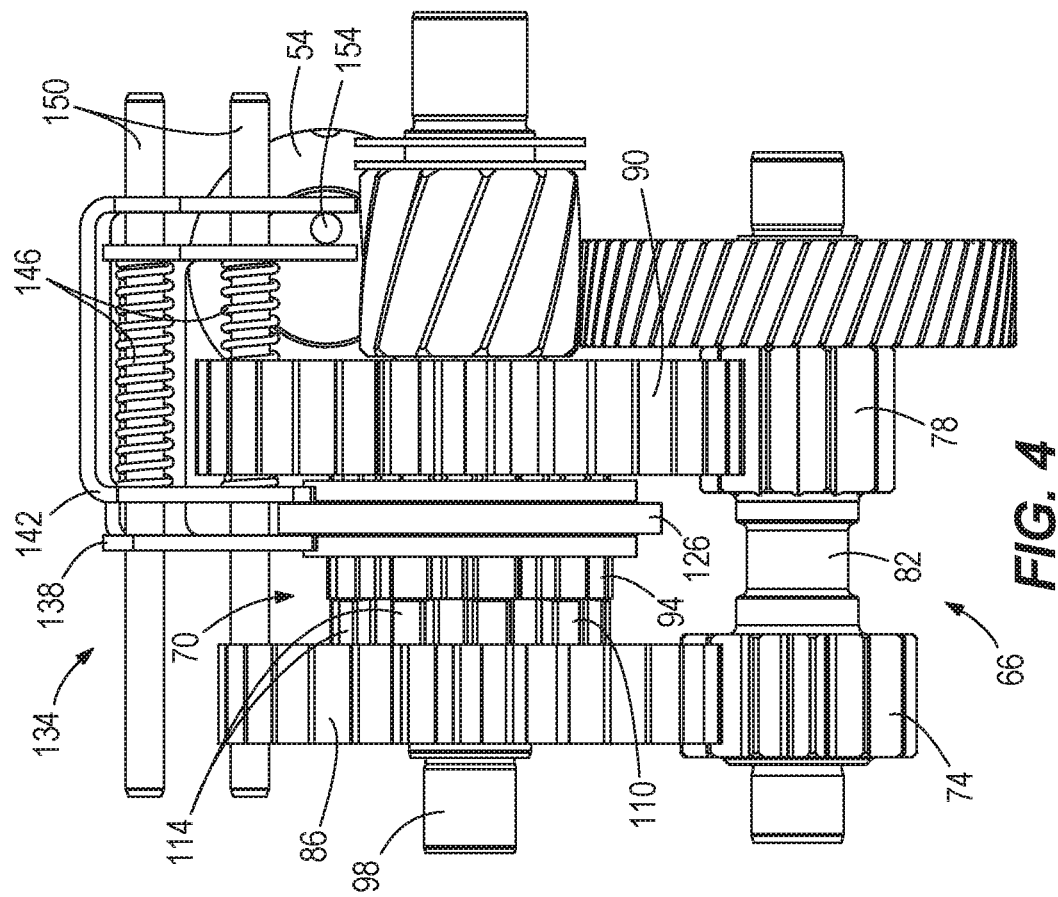
FIG. 5
FIG. 4

PIPE THREADER

CROSS-REFERENCE TO RELATED APPLICATIONS

This application claims priority to U.S. Provisional Patent Application Nos. 62/780,463 filed on Dec. 17, 2018, 62/719,860 filed on Aug. 20, 2018, 62/683,307 filed on Jun. 11, 2018, and 62/644,072 filed on Mar. 16, 2018, the entire contents of all of which are incorporated herein by reference.

FIELD OF THE INVENTION

The present invention relates to pipe threaders, and more particularly to powered pipe threaders.

BACKGROUND OF THE INVENTION

Pipe threaders include a die holder to hold a die that cuts threads on a pipe. A motor transmits torque to the die holder to rotate the die with respect to the pipe.

SUMMARY OF THE INVENTION

The present invention provides, in one aspect, a pipe threader configured to rotate a die. The pipe threader comprises a housing and a drive assembly including a motor and an output gear having a first plurality of teeth. The output gear receives torque from the motor. The pipe threader further comprises a die holder defining a rotational axis. The die holder includes a gear member including an outer circumference with a second plurality of teeth engaged with the first plurality teeth of the output gear, such that the die holder is rotatable in response to receiving torque from the output gear. The gear member also includes an inner circumference with a key recess. The die holder also includes a lock ring rotatable relative to the gear member and including a contact surface. The die holder also includes a key arranged in the key recess and a biasing member in the key recess and biasing the key toward the rotational axis. The lock ring is movable between a locked position, in which the contact surface inhibits the key from moving away from the rotational axis, and an unlocked position, in which the key is movable away from the rotational axis in response to insertion of the die into the die holder along the rotational axis.

The present invention provides, in another aspect, a pipe threader configured to rotate a die. The pipe threader comprises a housing and a drive assembly including a motor and an output gear having a first plurality of teeth. The output gear receives torque from the motor. The pipe threader further comprises a die holder defining a rotational axis. The die holder includes a gear member including an outer circumference with a second plurality of teeth engaged with the first plurality teeth of the output gear, such that the die holder is rotatable in response to receiving torque from the output gear. The gear member also includes an inner circumference with a first key recess and a second key recess, a pair of first detent recesses, and a pair of second detent recesses. The die holder also includes a lock ring rotatable relative to the gear member and including a first contact surface, a second contact surface, and a pair of detent members. The die holder also includes a first key arranged in the first key recess and a second key arranged in the second key recess, a first biasing member in the first key recess biasing the first key toward the rotational axis, and a second biasing member in the second key recess biasing the second key toward the rotational axis. The lock ring is movable between a locked position, in which the detent members are respectively arranged in the first detent recesses, and the first and second contact surfaces respectively inhibit the first and second keys from moving away from the rotational axis, and an unlocked position, in which the detent members are respectively arranged in the second detent recesses, and the first and second keys are movable away from the rotational axis in response to insertion of the die into the die holder along the rotational axis.

The present invention provides, in yet another aspect, a pipe threader configured to rotate a die. The pipe threader comprises a housing and a drive assembly including a motor and an output gear having a first plurality of teeth. The output gear receives torque from the motor. The pipe threader further comprises a die holder defining a rotational axis. The die holder includes a gear member including an outer circumference with a second plurality of teeth engaged with the first plurality teeth of the output gear, such that the die holder is rotatable in response to receiving torque from the output gear. The gear member also includes an inner circumference with a key recess. The die holder further includes a lock ring rotatable relative to the gear member and including a contact surface and a key arranged in the key recess. The key includes a body including a spring recess and a key portion extending radially inward from the body. The key portion includes two edges obliquely oriented with respect to the rotational axis, a flat nose between the two edges, and two opposite side faces for transferring torque from the die holder to the die through the key. The die holder further includes a compression spring in the key recess and received in the spring recess, such that the key is biased toward the rotational axis. The lock ring is movable between a locked position, in which the contact surface of the lock ring inhibits the key from moving away from the rotational axis, and an unlocked position, in which the key is movable away from the rotational axis in response to insertion of the die into the die holder along the rotational axis. When the lock ring is in the unlocked position and the die is inserted into the die holder along the rotational axis, the key is biased into a recess in the die, such that torque is transferable from the die holder to the die through one of the side faces of the key portion, causing the die to rotate with the die holder.

The present invention provides, in yet another aspect, a pipe threader comprising a housing, a drive assembly including a motor, and a die holder defining a rotational axis. The die holder is switchable between an activated state in which the die holder receives torque from the drive assembly, and a deactivated state, in which die holder does not receive torque from the drive assembly. The pipe threader further comprises a sensor configured to detect a rotational speed of the housing about the rotational axis while the die holder is in the activated state. A stopping event is initiated to switch the die holder from the activated state to the deactivated state when the sensor detects that the rotational speed of the housing exceeds a threshold value.

The present invention provides, in yet another aspect, a pipe threader comprising a housing, a drive assembly including a motor, and a die holder defining a rotational axis. The die holder is switchable between an activated state in which the die holder receives torque from the motor, and a deactivated state, in which die holder does not receive torque from the motor. The pipe threader further comprises a sensor configured to detect a rotational speed of the housing about the rotational axis while the die holder is in the activated state, a controller configured to repeatedly sample the rotational speed of the housing detected by the sensor while the die holder is in the activated state, and a counter that is incremented each time the sample is above a threshold speed value and reset each time the sample is below the threshold speed value. A stopping event is initiated to switch the die holder from the activated state to the deactivated state when the counter is equal to a threshold counter value.

The present invention provides, in yet another aspect, a method of operating a pipe threader including a housing, a motor, and a die holder that receives torque from the motor. The method comprises the detecting a rotational speed of the housing about a rotational axis of the die holder with a sensor while the die holder is receiving torque from the motor, repeatedly sampling the rotational speed of the housing detected by the sensor, incrementing a counter each time the sample is above a threshold speed value, resetting the counter each time the sample is below the threshold speed value, and discontinuing transfer of torque from the motor to the die holder when the counter is equal to a threshold counter value.

The present invention provides, in yet another aspect, a pipe threader configured to thread a pipe. The pipe threader comprises a housing, a motor supported by the housing, and a die holder that receives torque from the motor, causing the die holder to rotate about a rotational axis. The die holder is configured to receive a die for co-rotation therewith. The pipe threader further comprises a projection arranged on the housing. When the die is arranged on the pipe, the projection is configured to receive a force applied by a user in a direction parallel to or coaxial with the rotational axis to initiate a pipe-threading operation in response to rotation of the die.

The present invention provides, in yet another aspect, a pipe threader assembly comprising a die including teeth configured to cut threads on a pipe and a pipe threader including a motor and a die holder that receives torque from the motor, causing the die holder to rotate about a rotational axis. The die holder is configured to receive the die for co-rotation therewith. The die includes a surface that is rotatable relative to the teeth configured to receive a force applied by a user in a direction parallel to or coaxial with the rotational axis to initiate a pipe-threading operation in response to rotation of the die.

The present invention provides, in yet another aspect, a pipe threader configured to rotate a die. The pipe threader comprises a drive assembly including a motor and an output gear having a first plurality of teeth, the output gear receiving torque from the motor. The pipe threader also comprises a die holder defining a rotational axis. The die holder includes an outer circumference, an inner circumference, and a second plurality of teeth arranged on the outer circumference and engaged with the first plurality teeth of the output gear, such that the die holder is rotatable in response to receiving torque from the output gear. The die holder also includes a die holder recess defined in the inner circumference and a biasing member and a key arranged within the die holder recess, the biasing member biasing the key toward the rotational axis. In response to the die being inserted into the die holder along the rotational axis, the key is biased into the recess in the die, and wherein torque is transferred from the die holder, through the key, and to the die, causing the die to rotate with the die holder.

The present invention provides, in yet another aspect, a pipe threader comprising a housing and a drive assembly including a motor and an output gear having a first plurality of teeth, the output gear receiving torque from the motor. The pipe threader also comprises a die holder defining a rotational axis. The die holder includes a gear member including an outer circumference with a second plurality of teeth engaged with the first plurality teeth of the output gear, such that the die holder is rotatable in response to receiving torque from the output gear. The gear member also includes an inner circumference with a slot and a body portion defining a channel with a spring seat. The die holder also includes a lock ring rotatable relative to the gear member. The lock ring includes a contact surface, a recess adjacent the contact surface, and a protrusion extending into the channel. The die holder also includes a lock member arranged in the slot. The lock member includes a shoulder and is moveable between a first position, in which the shoulder is engaged against the contact surface, and a second position, in which the shoulder is received in the recess. The die holder also includes a lock spring biasing the lock member away from the rotational axis and a compression spring arranged in the channel between the spring seat and the protrusion. The compression spring biases the lock ring in a first rotational direction to a first rotational position, in which the lock member is in the first position. In response to the lock ring being rotated in a second rotational direction that is opposite the first rotational direction, the lock ring is rotated from the first rotational position to a second rotational position, in which the lock member is biased by the lock spring into the second position.

Other features and aspects of the invention will become apparent by consideration of the following detailed description and accompanying drawings.

BRIEF DESCRIPTION OF THE DRAWINGS

FIG. 4 is a plan view of a portion of a transmission of the pipe threader of FIG. 1 with a shifting collar of the transmission in a low speed, high torque position.

FIG. 5 is a perspective view of a portion of a transmission of the pipe threader of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
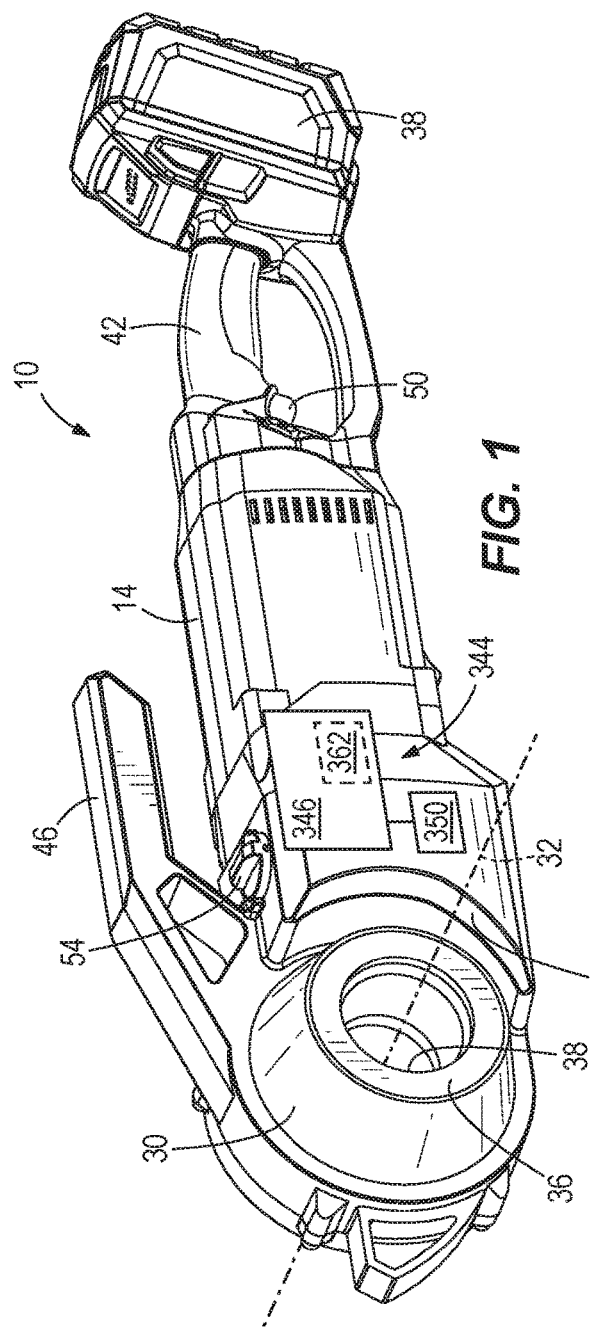
FIG. 1 is a perspective view of a pipe threader.
Figure 2:
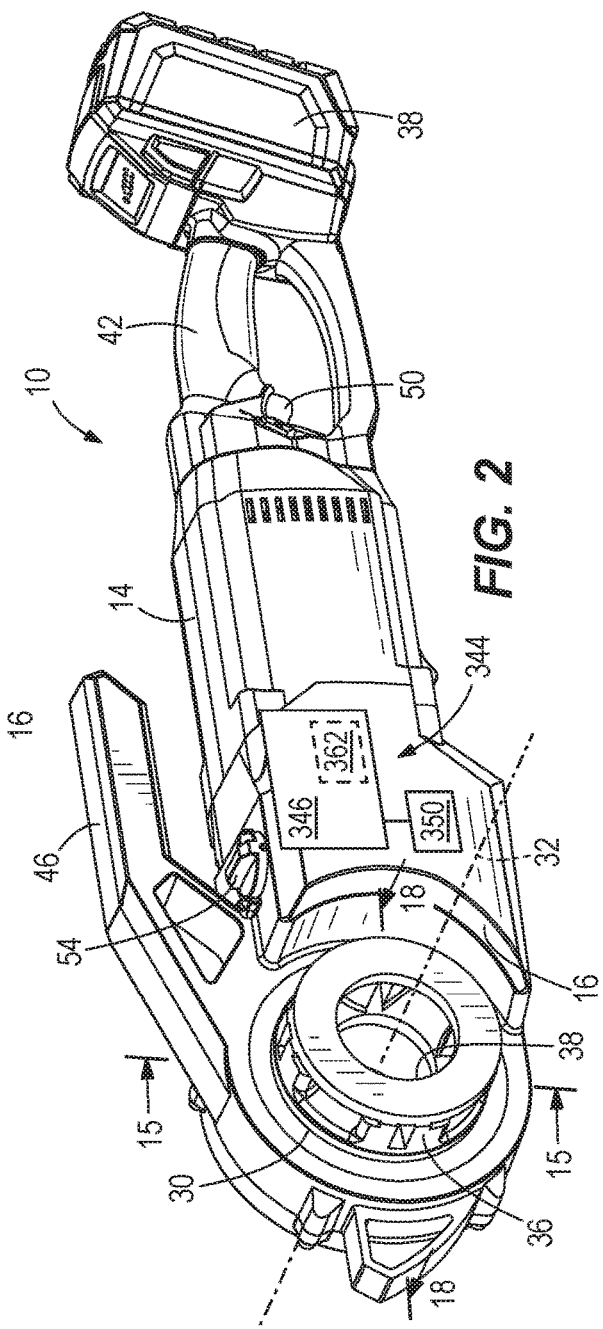
FIG. 2 is a perspective view of another embodiment of a pipe threader holding a die.
Figure 3:
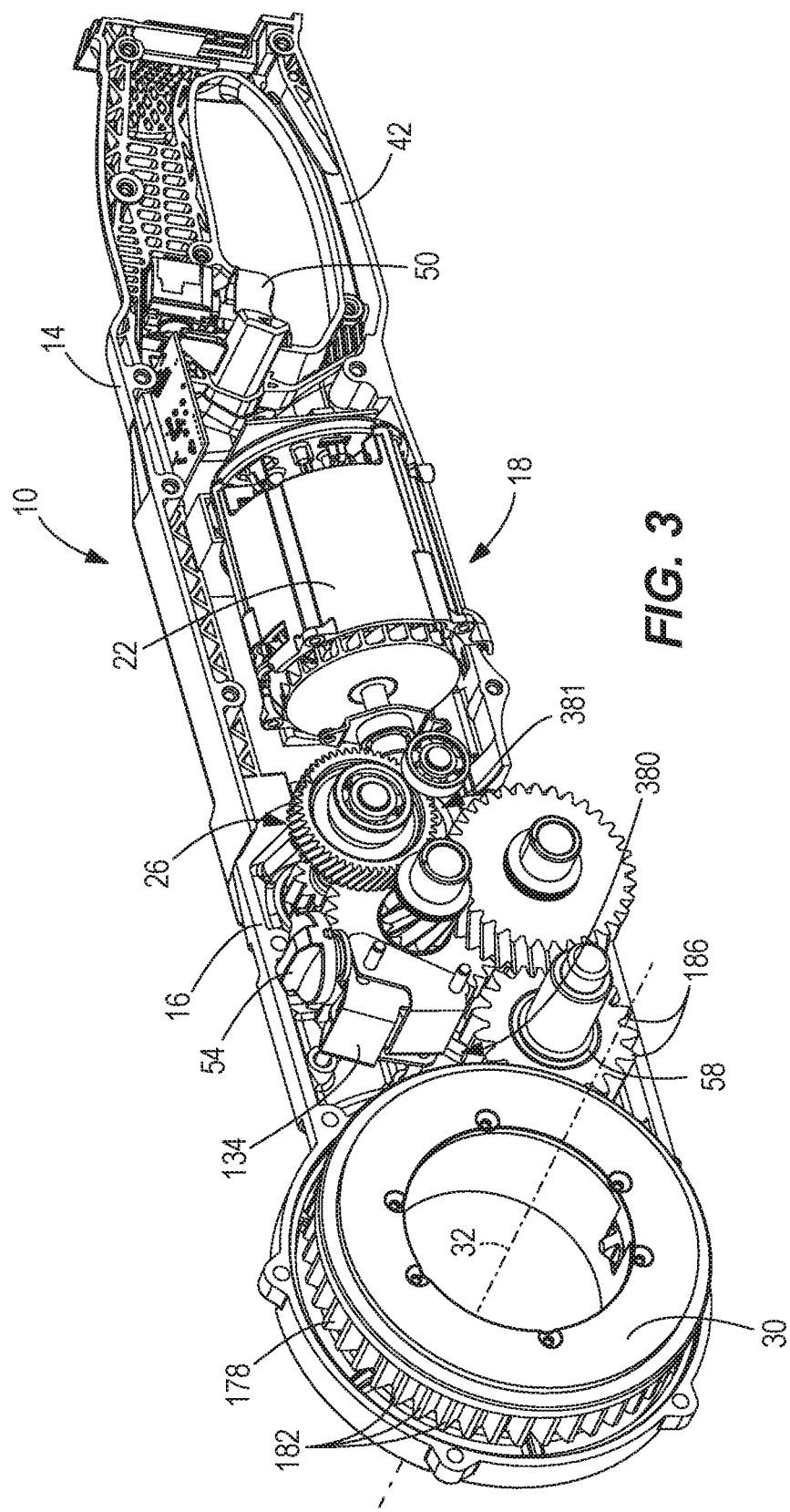
FIG. 3 is a perspective view of the pipe threader of FIG. 1 with portions removed.

FIGS. 1-3 illustrate a pipe threader 10 having a housing 14 including a gearcase 16, a drive assembly 18 including a motor 22 and a transmission 26, and a die holder 30 for selectively receiving a die 34 with teeth for cutting threads on a pipe (not shown) and defining a rotational axis 32. In some embodiments, the die 34 is a 1.5-inch or 2-inch die. The die holder 30 is also capable of receiving a die adapter (not shown) configured for use with 1.25-inch and smaller dies. The motor 22 is powered by a battery 38 that is selectively coupled to the housing 14. In some embodiments, the battery 38 is a nickel-cadmium battery. In some embodiments, the battery 38 is a lithium ion battery. In some embodiments, the battery 38 is a battery pack that is interchangeably connectable to the pipe threader 10 and to a plurality of different power tools to supply power thereto. As explained in further detail below, the transmission 26 transmits torque from the motor 18 to the die holder 30, such that the die holder 30 rotates while holding the die 34, causing the die 34 to cut threads on a pipe.

Figure 35:
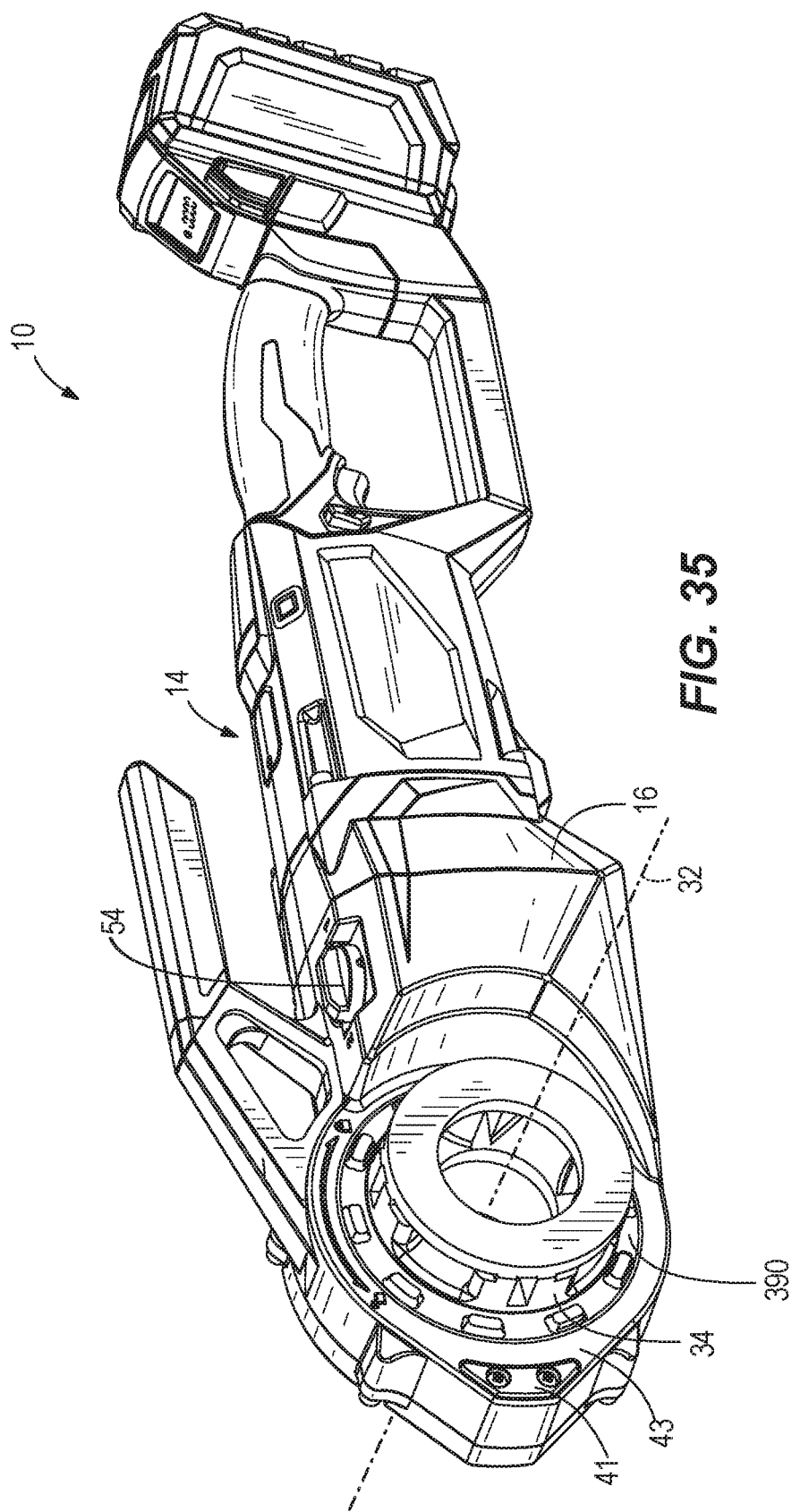
FIG. 35 is a perspective view of another embodiment of a pipe threader holding a die.
Figure 36:
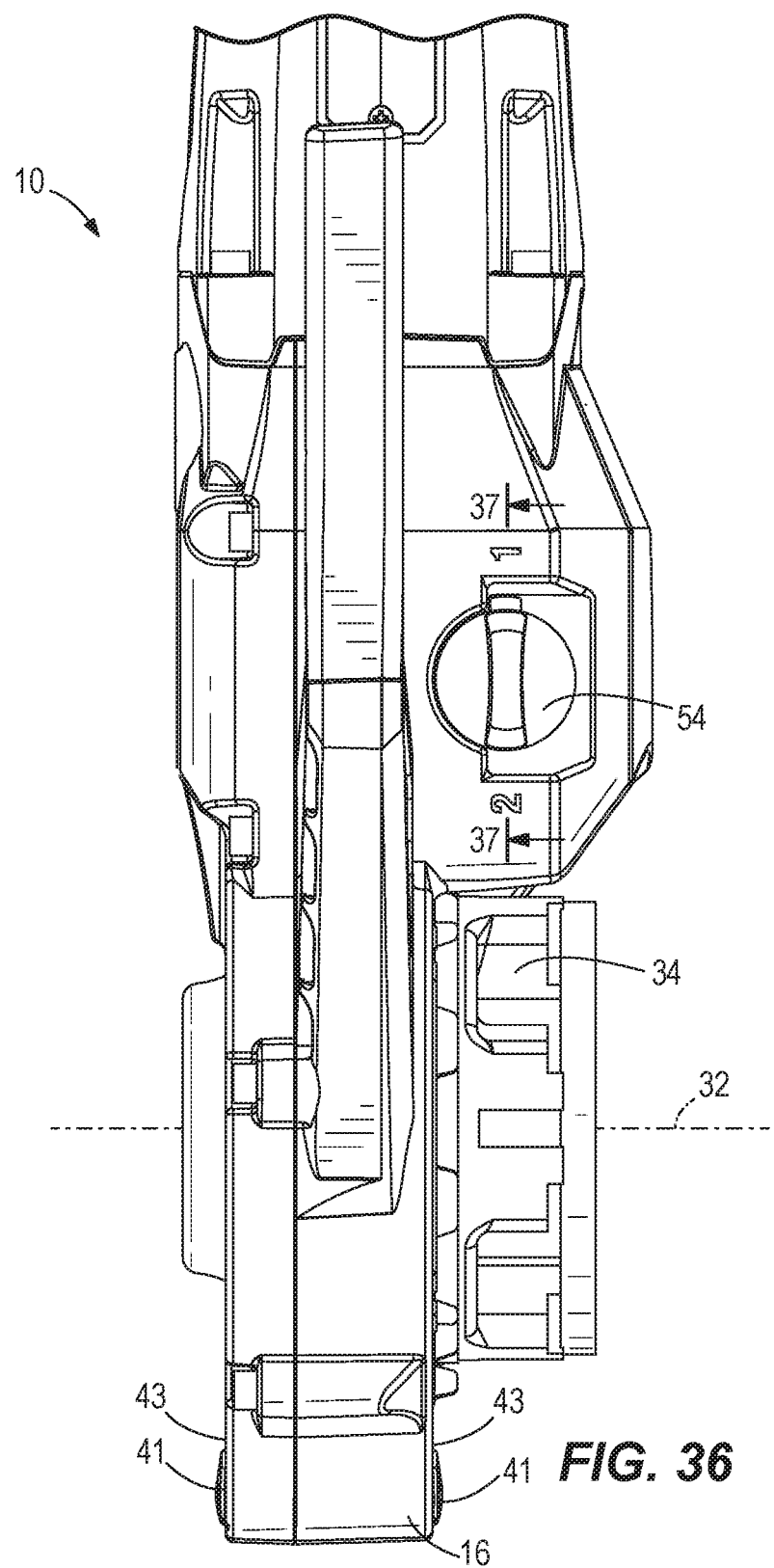
FIG. 36 is an enlarged plan view of the pipe threader of FIG. 35.

As shown schematically in the embodiment in FIG. 1, pipe threader 10 can include a non-rotating projection 36 extending from the gearcase 16 around the die holder 30. The projection 36 has an annular face 38 that is concentric with the die holder 30, but in other embodiments, the projection 36 can be located elsewhere on the housing 14. In some embodiments, the non-rotating projection 36 is a thrust bearing. When the die 34 is arranged on the pipe, the projection 36 is configured to receive a force applied by a user in a direction parallel to or coaxial with the rotational axis 32 to initiate a pipe-threading operation in response to rotation of the die 34. In other words, the projection 36 provides the user a stationary location relative to the housing 14 against which to push the die 34 onto the pipe to initiate a pipe-threading operation. In the embodiment in FIG. 2, the pipe threader 10 does not include the on-board projection 36. Rather, the die 34 includes a surface 40 configured to rotate relative to teeth on the die. In some embodiments, a thrust bearing is coupled to the die 34 and the surface 40 is defined on the thrust bearing. In another embodiment in FIGS. 35 and 36, the pipe threader 10 includes a pair of palm handle projections 41 that are arranged on opposite sides of the gearcase 16. The palm handle projections 41 each extend outwardly from the respective surface 43 of the gearcase 16 adjacent the die holder 30 and die 34, and are configured to receive a force applied by a user in a direction parallel to the rotational axis 32 to initiate a pipe-threading operation in response to rotation of the die 34. As illustrated in FIG. 36, the palm handle projections 41 have a substantially trapezoidal shape.

With continued reference to FIGS. 1 and 2, the housing 14 includes an operating handle 42 and a support handle 46 near the die holder 30. The pipe threader 10 includes a trigger 50 on the operating handle 42 for activating the motor 22 and a speed shift knob 54 allowing an operator to switch the die holder 30 (and thus the die 34) between a high rotational speed and a low rotational speed.

Figure 18:
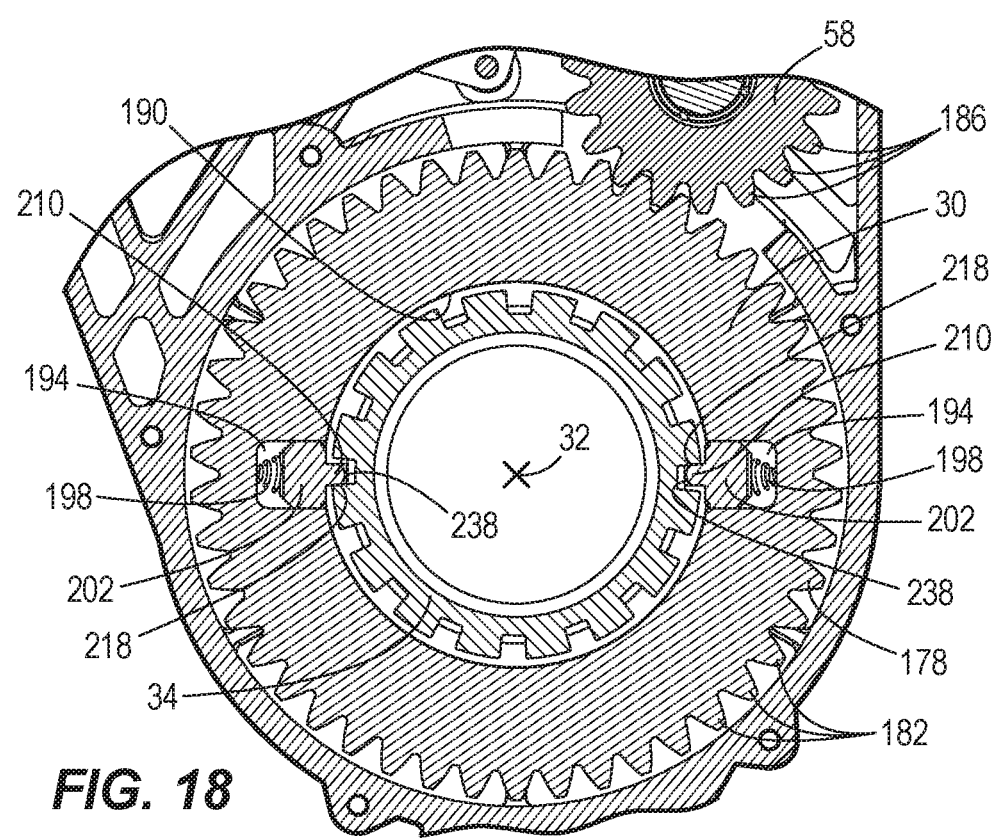
FIG. 18 is a cross-sectional view of the die of FIG. 14 fully inserted into the die holder of FIG. 10.

As shown in FIGS. 3 and 18, the transmission 26 includes an output gear 58 for transmitting torque to the die holder 30. As shown in FIG. 4, transmission 26 also includes a third stage gear 66 and a fourth stage gear 70. The third gear stage 66 includes a first driving gear 74 and a second driving gear 78 axially offset from the first driving gear 74. The first and second driving gears 74, 78 are coupled for rotation with a first stage gear shaft 82, which receives torque from the electric motor 22. The fourth gear stage 70 includes first and second driven gears 86, 90 and a hub 94 supported on a fourth stage gear shaft 98 between the driven gears 86, 90. The fourth stage gear shaft 98 receives torque from the first stage gear 66 and then transmits the torque downstream to the output gear 58, the die holder 30, and the die 34.

As shown in FIG. 5, the hub 94 is coupled for co-rotation with the fourth stage gear shaft 98 using a spline-fit 102. The first and second driven gears 86, 90 are axially fixed on the fourth stage gear shaft 98. The fourth stage gear shaft 98 extends through a cylindrical bore in each of the respective driven gears 86, 90 such that the driven gears 86, 90 are rotatable relative to the fourth stage gear shaft 98.

With reference to FIG. 4, the first driving gear 74 and the first driven gear 86 are sized to provide a first gear reduction and the second driving gear 78 and the second driven gear 90 are sized to provide a second gear reduction greater than the first gear reduction. Accordingly, during operation, the first driven gear 86 rotates at a relatively high speed and low torque, and the second driven gear 90 rotates at a relatively low speed and high torque.

Figure 6:
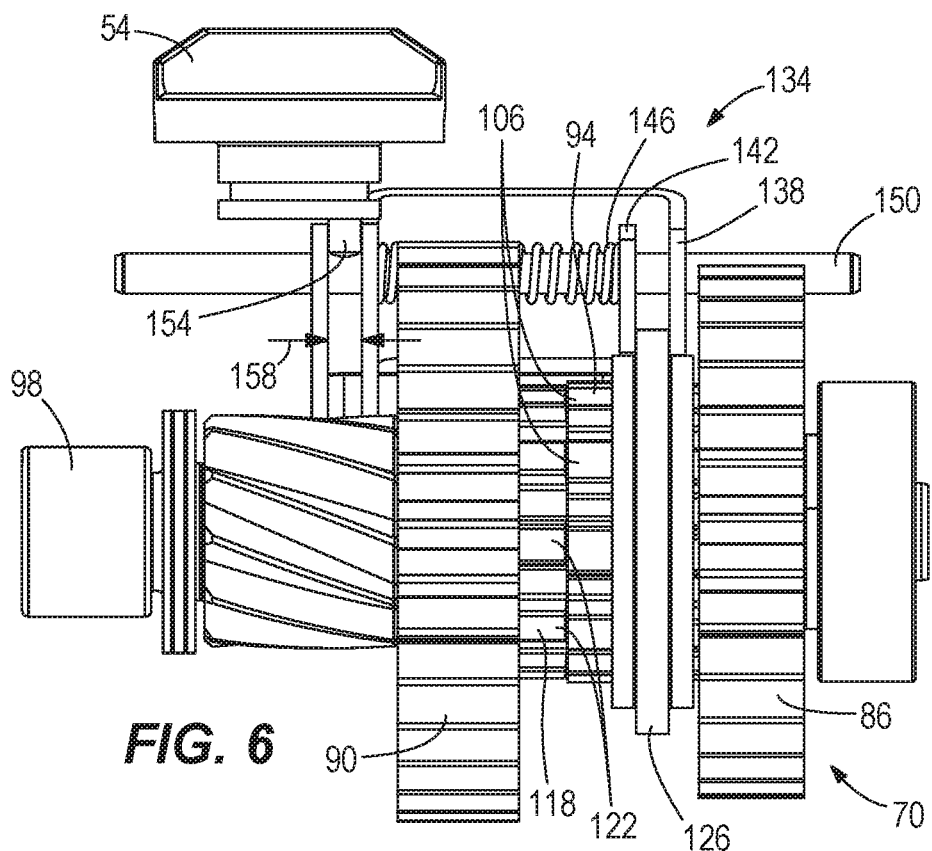
FIG. 6 is a plan view of a portion of a transmission of the pipe threader of FIG. 1 with a shifting collar of the transmission in a high speed, low torque position.
Figure 7:
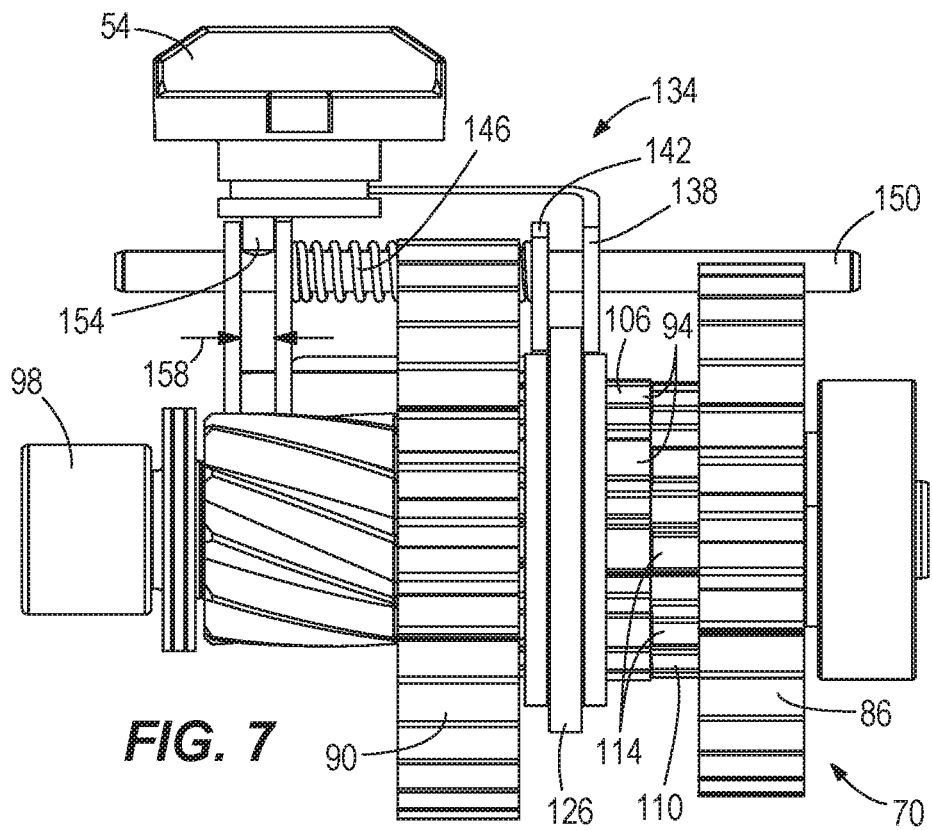
FIG. 7 is a plan view of a portion of a transmission of the pipe threader of FIG. 1 with a shifting collar of the transmission in a low speed, high torque position.
Figure 8:
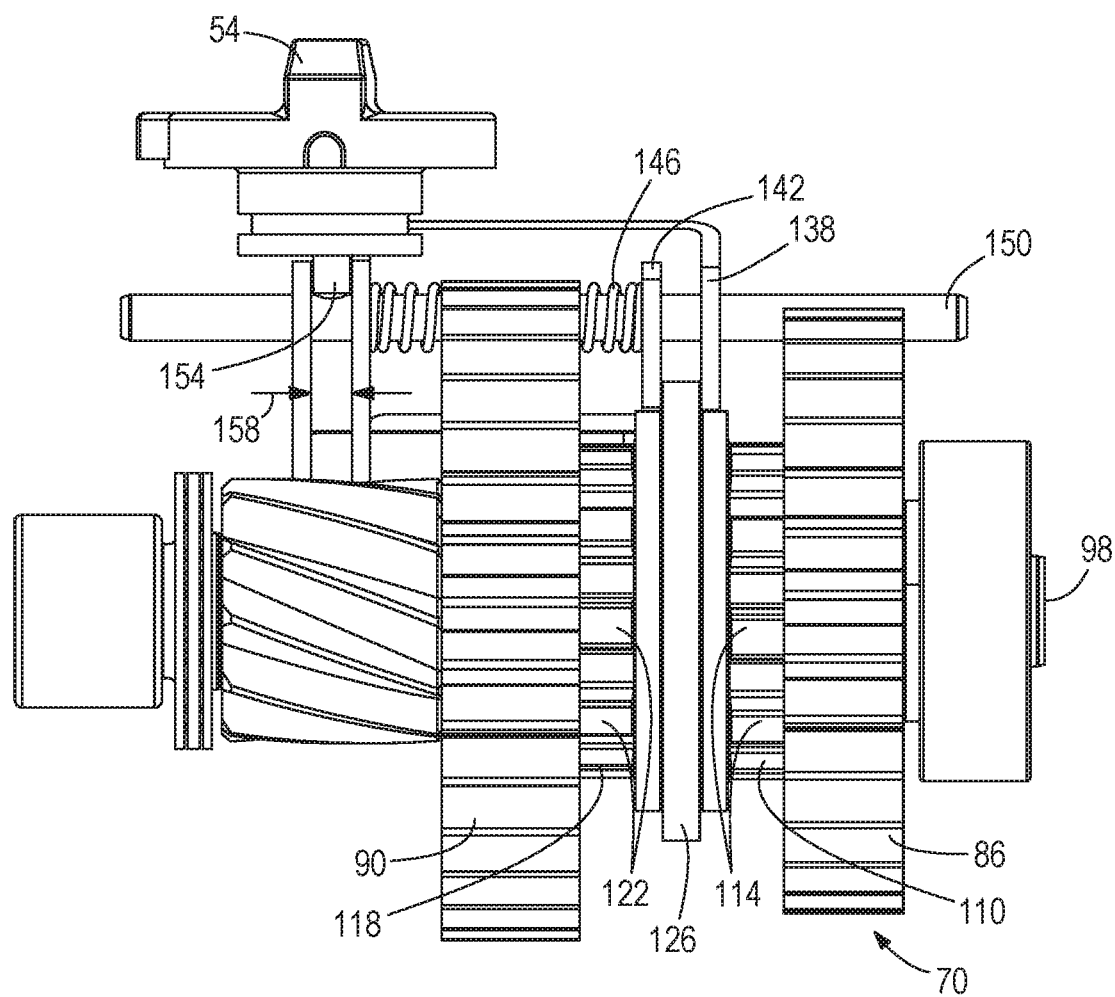
FIG. 8 is a plan view of a portion of a transmission of the pipe threader of FIG. 1 with a shifting collar of the transmission in a neutral position.

With reference to FIG. 5, the hub 94 includes a plurality of axially-extending, external splines 106. The first driven gear 86 includes splined portion 110 adjacent the hub 94 that has a corresponding plurality of external splines 114. Similarly, the second driven gear 90 also includes a splined portion 118 adjacent the hub 94 that has a corresponding plurality of external splines 122. With continued reference to FIG. 5, the transmission 26 further includes a collar 126 having a plurality of internal splines 130 that receive the external splines 106 of the hub 94 to couple the collar 126 for co-rotation with the hub 94. As shown in FIGS. 6-8, the collar 126 is shiftable along the fourth stage gear shaft 98 to alternatively interconnect the splines 106 on the hub 94 with the splines 114 of the first driven gear 86 or the splines 122 of the second driven gear 90.

The transmission 18 further includes a shift mechanism 134 operable to move the collar 126 between a first position (FIG. 6), in which the collar 126 engages the splined portion 110 of the first driven gear 86 and the hub 94 to couple the first driven gear 86 and the hub 94 for co-rotation, and a second position (FIG. 7), in which the collar 126 engages the splined portion 118 of the second driven gear 90 and the hub 94 to couple the second driven gear 90 and the hub 94 for co-rotation.

The shift mechanism 134 includes a pair of linearly movable, nested brackets 138, 142 for shifting the collar 126 between the first and second positions. Two coil springs 146 are disposed between the two brackets 138, 142 respectively on two parallel rods 150. The brackets 138, 142 and the springs 146 are movable together along the rods 150, in response to manual manipulation of the speed shift knob 54. The speed shift knob includes an eccentric pin 154 that is received within a gap 158 between the shift brackets 138, 142. As such, rotation of the speed shift knob 54 causes linear movement of the brackets 138, 142 (and therefore, the collar 126).

Figure 9:
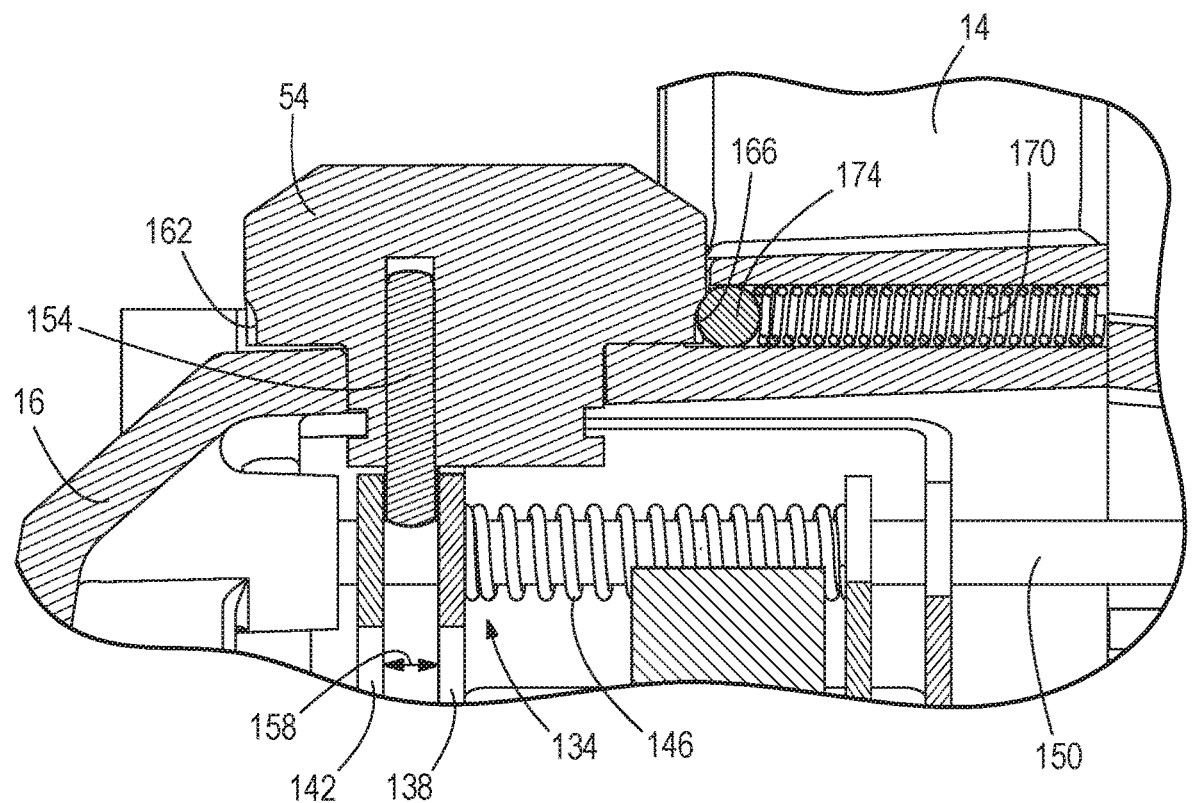
FIG. 9 is a cross-sectional view of the pipe threader of FIG. 1.

As shown in FIG. 9, the speed shift knob 54 includes a first detent 162 and a second detent 166 located on an opposite side of the knob 54 from the first detent 162. A compression spring 170 trapped in the housing 14 biases a ball 174 into one of the first or second detents 162, 166, depending on how the speed shift knob 54 has been rotated. As shown in FIG. 9, the ball 174 is biased into the second detent 166, which corresponds to the second position (FIG. 7) of the shift mechanism 134. A one-hundred and eighty degree rotation of the speed shift knob 54 would then cause the ball 174 to be biased into the first detent 162, corresponding to the first position (FIG. 6) of the shift mechanism 134. Once a position of the speed shift knob 54 has been selected, the ball 174 holds the speed shift knob 54 in that position.

Figure 37:
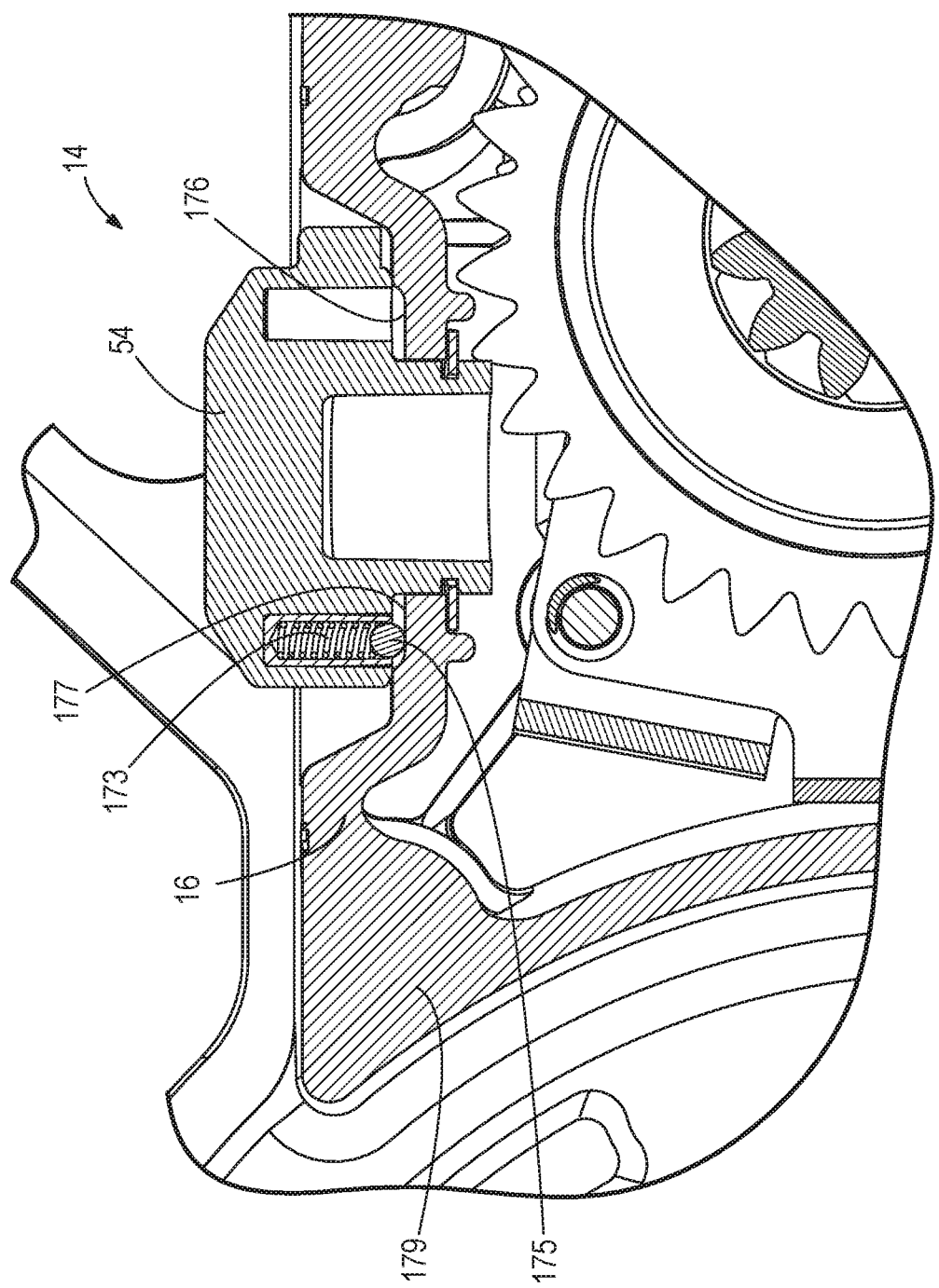
FIG. 37 is a cross-sectional view of the pipe threader of FIG. 35.

In another embodiment shown in FIG. 37, a compression spring 173 and a ball 175 are trapped within the speed shift knob 54, and a first detent 176 and a second detent 177 are arranged on the gearcase 179 of the housing 14. Thus, the ball 175 is biased by the spring 173 into one of the first or second detents 176, 177 depending on how the speed shift knob 54 has been rotated. As shown in FIG. 37, the ball 175 is biased into the second detent 177, which corresponds to the second position (FIG. 7) of the shift mechanism 134. A 180-degree rotation of the speed shift knob 54 would then cause the ball 175 to be biased into the first detent 176, corresponding to the first position (FIG. 6) of the shift mechanism 134. Once a position of the speed shift knob 54 has been selected, the ball 175 holds the speed shift knob 54 in that position.

Operation of the transmission 26 will now be discussed with respect to FIGS. 6-8. FIG. 6 illustrates the transmission 26 configured in a high speed, low torque mode. In this mode, the shift mechanism 134 and the collar 126 are shifted to the first position, thereby coupling the first driven gear 86 to the hub 94 for co-rotation. As such, the fourth stage gear shaft 98, the hub 94, and the first driven gear 86 all co-rotate together at a relatively high speed. Thus, the die holder 30 and die 34 rotate at high speed, with low torque. Because the second driven gear 90 is continuously meshed with the second driving gear 78 (FIG. 4), the second driven gear 90 continues to rotate at a relatively slow speed (i.e., slower than the rotational speed of the fourth stage gear shaft 98) and relative to the fourth stage gear shaft 98.

FIGS. 4 and 7 illustrate the transmission 26 configured in a low speed, high torque mode. In this mode, the shift mechanism 134 and the collar 126 are shifted to the second position, thereby coupling the second driven gear 90 to the hub 94 for co-rotation. As such, the fourth stage gear shaft 98, the hub 94, and the second driven gear 90 all co-rotate together at a relatively low speed. Thus, the die holder 30 and die 34 rotate at low speed, with high torque. Because the first driven gear 86 remains continuously meshed with the first driving gear 74 (FIG. 4), the first driven gear 86 continues to rotate at a relatively high speed (i.e., faster than the rotational speed of the fourth stage gear shaft 98) and rotates relative to the third stage gear shaft 98.

To shift the transmission 18 from the high speed, low torque mode (FIG. 6) to the low speed, high torque mode (FIG. 7), a user begins rotating the speed shift knob 54. As the speed shift knob 54 rotates, the eccentric pin 154 bears against the second bracket 142 which, in turn, pushes against the springs 146 to move the first bracket 138 and the collar 126 toward the second position.

FIG. 8 illustrates the collar 158 in a neutral position, midway between the first position and the second position. In the neutral position, the collar 158 is disengaged from both the first and second driven gears 86, 90 such that no torque is transferred from the driven gears 86, 90 to the hub 94 (and therefore, the fourth stage gear shaft 98).

If the user continues to rotate the speed shift knob 54 and the internal splines 130 of the collar 126 are not yet aligned with the splines 122 of the second driven gear 90, the springs 146 are compressed between the brackets 138, 142. Once the respective splines 122, 130 are aligned, the springs 146 urge the first bracket 138 and the collar 126 into the second position (FIG. 7). Accordingly, with this "soft shifting" gear mechanism, the spring 146 permits a delay between rotation of the speed shift knob 54 and engagement of the collar 126 with the second driven gear 90.

To shift the transmission 18 from the low speed, high torque mode (FIG. 7) back to the high speed, low torque mode (FIG. 6), the user begins rotating the speed shift knob 54 in the opposite direction. As the speed shift knob 54 rotates, the eccentric pin 154 bears against the first bracket 138 which, in turn, pushes against the spring 146 to move the second bracket 142 and the collar 126 toward the first position. Once the collar 126 reaches the neutral position (FIG. 8), if the user continues to rotate the speed shift knob 54 and the internal splines 130 of the collar 126 are misaligned with the splines 114 of the first driven gear 86, the spring 146 is compressed between the brackets 138, 142. Once the splines 114, 130 are aligned, the spring 146 urges the second bracket 142 and the collar 126 into the first position (FIG. 6). Accordingly, with the "soft shifting" gear mechanism, the spring 146 permits a delay between rotation of the speed shift knob 54 and engagement of the collar 126 with the first driven gear 86.

Figure 10:
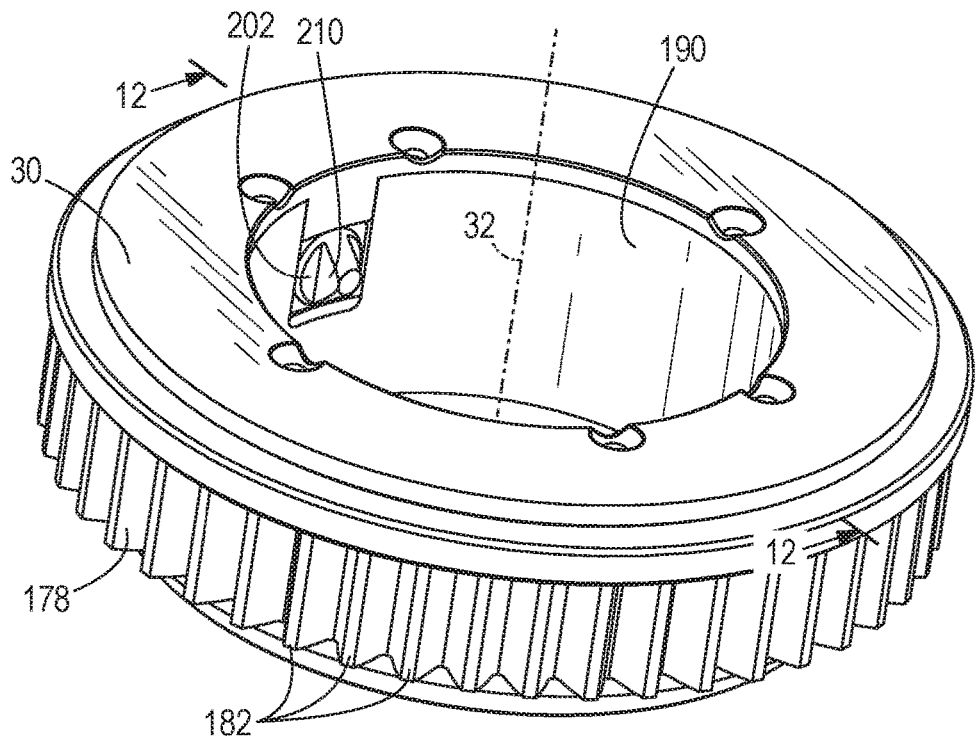
FIG. 10 is a perspective view of a die holder of the pipe threader of FIG. 1.
Figure 11:
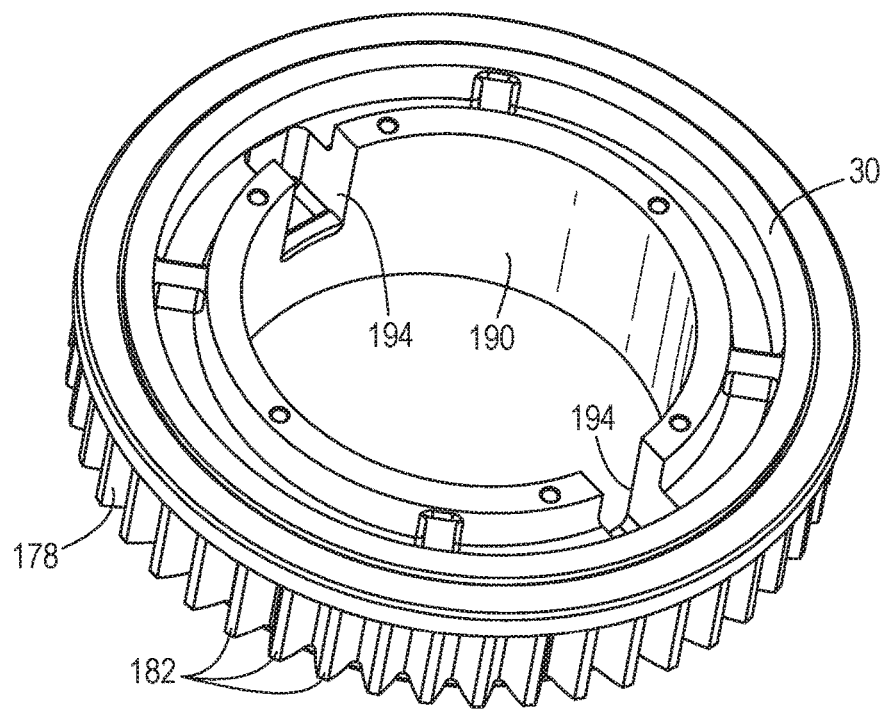
FIG. 11 is a perspective view of the die holder of FIG. 10, with portions removed.
Figure 12:
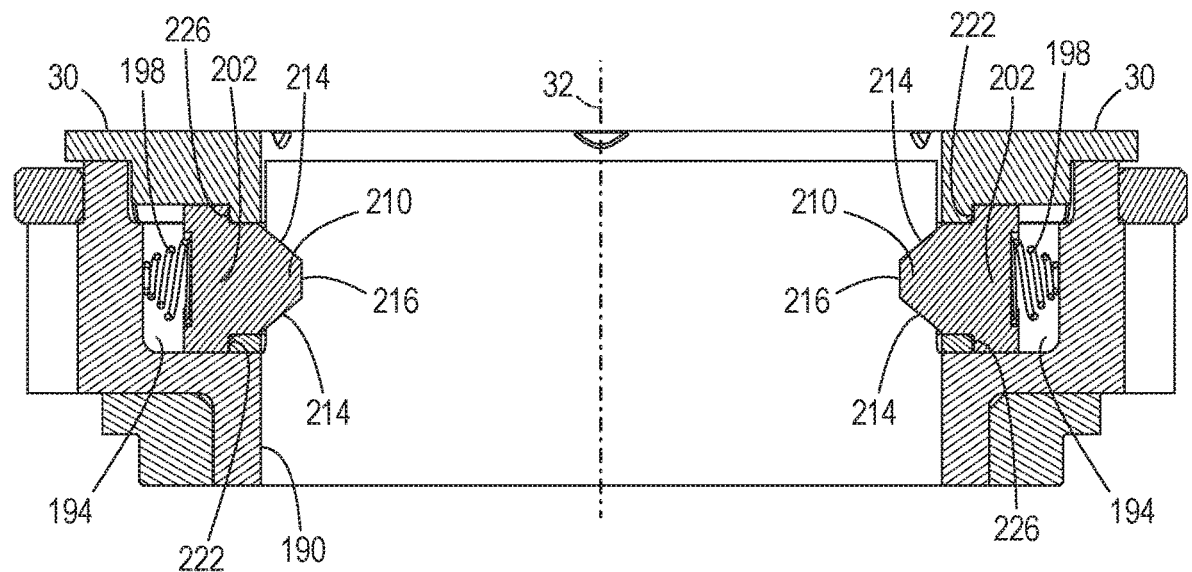
FIG. 12 is a cross-sectional view of the die holder of FIG. 10.

As shown in FIGS. 10, 11 and 18, the die holder 30 includes an outer circumference 178 with teeth 182 that are engaged with teeth 186 of the output gear 58, such that the output gear 58 may transmit torque from the drive assembly 18 to the die holder 30. The die holder 30 also includes an inner circumference 190 defining two recesses 194 arranged opposite each other. As shown in FIGS. 10 and 12, a compression spring 198 and a torque key 202 are arranged in each recess 194, such that the torque keys 202 are biased radially inward toward the rotation axis 32.

Figure 13:
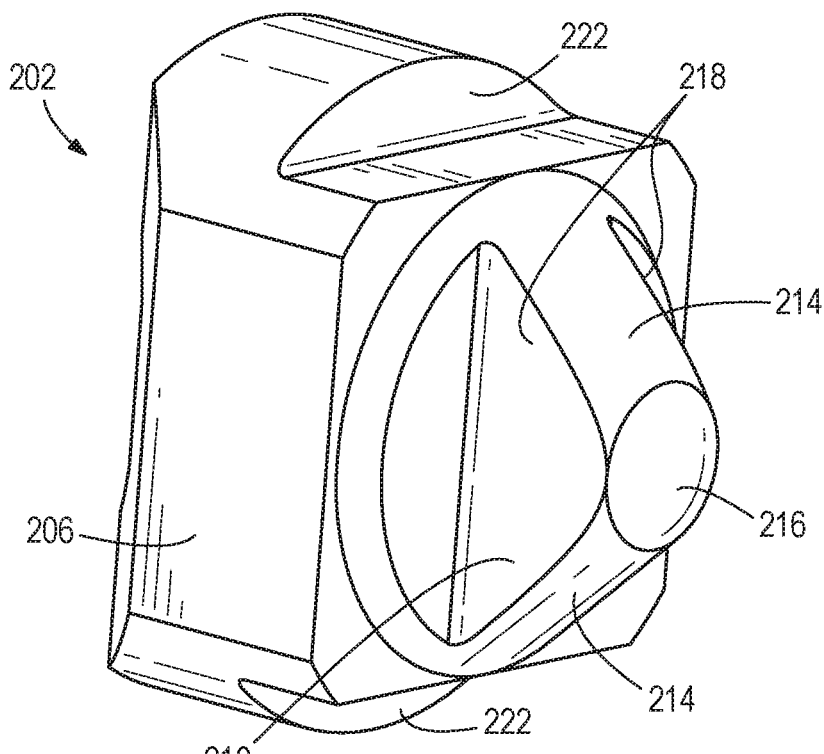
FIG. 13 is a perspective view of a key of the die holder of FIG. 10.

As shown in FIG. 13, each torque key 202 has a body 206 and a key portion 210 extending radially inward from the body 206. The key portion 210 includes two edges 214 obliquely oriented with respect to the rotational axis 32, a flat nose 216 between the two edges 214, and two opposite side faces 218. A pair of shoulders 222 extend from the body 206 in a direction parallel to the rotational axis 32. As shown in FIG. 12, the die holder 30 includes a pair of ledges 226 extending parallel to the rotation axis 32 adjacent of each recess 194. As the torque keys 202 are biased towards the rotation axis 32 by the springs 198, the shoulders 222 about the ledges 226, thus preventing the keys 202 from popping out of the die holder 30.

Figure 14:
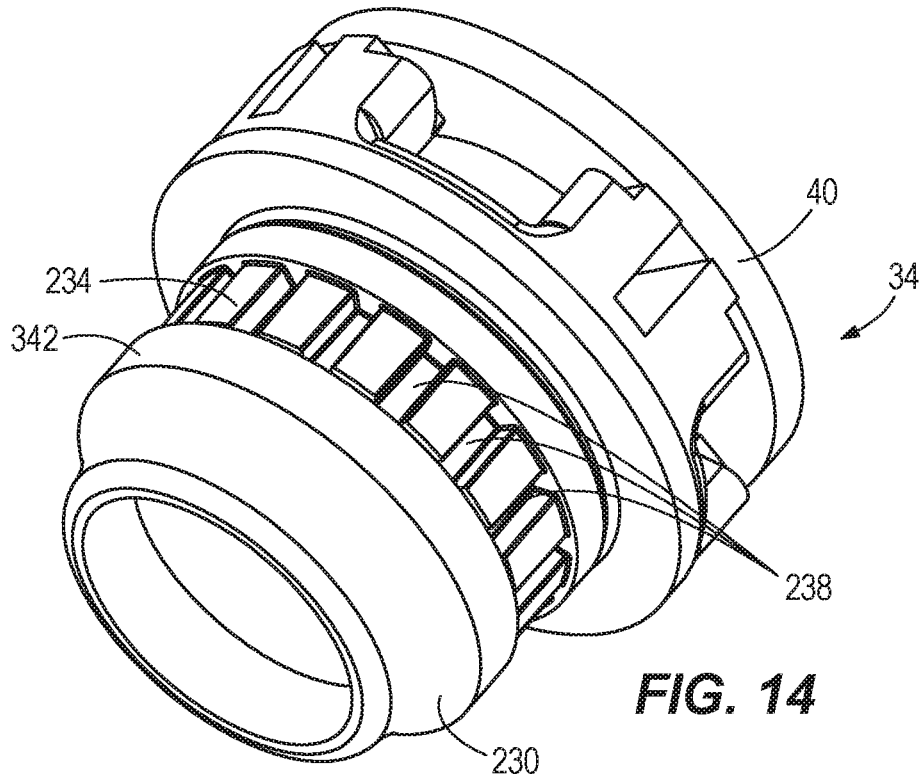
FIG. 14 is a perspective view of a die for use with the die holder of FIG. 10.

As shown in FIG. 14, the die 34 includes a curvilinear edge 230 opposite the projection 40, a recessed portion 234 with a plurality of discrete recesses 238 therein, and a cylindrical portion 342 between the recessed portion 234 and the curvilinear edge 230.

As shown schematically in FIGS. 1 and 2, the pipe threader 10 also includes a loss of control detection mechanism 344 including a controller 346 and a sensor 350 (e.g., a gyroscope) for detecting the relative movement and/or orientation of the housing 14 about the rotational axis 32. The controller 346 is electrically connected with the motor 22 and the sensor 350. During operation of the pipe threader 10, it is possible for the teeth of the die 34 to become snagged or caught on the pipe. However, because the drive assembly 18 continues transmitting torque to the die 34, the housing 14 of the pipe threader 10 can suddenly and unexpectedly rotate about the rotational axis 32. As described further below, the loss of control detection mechanism 344 substantially prevents this from happening.

Figure 15:
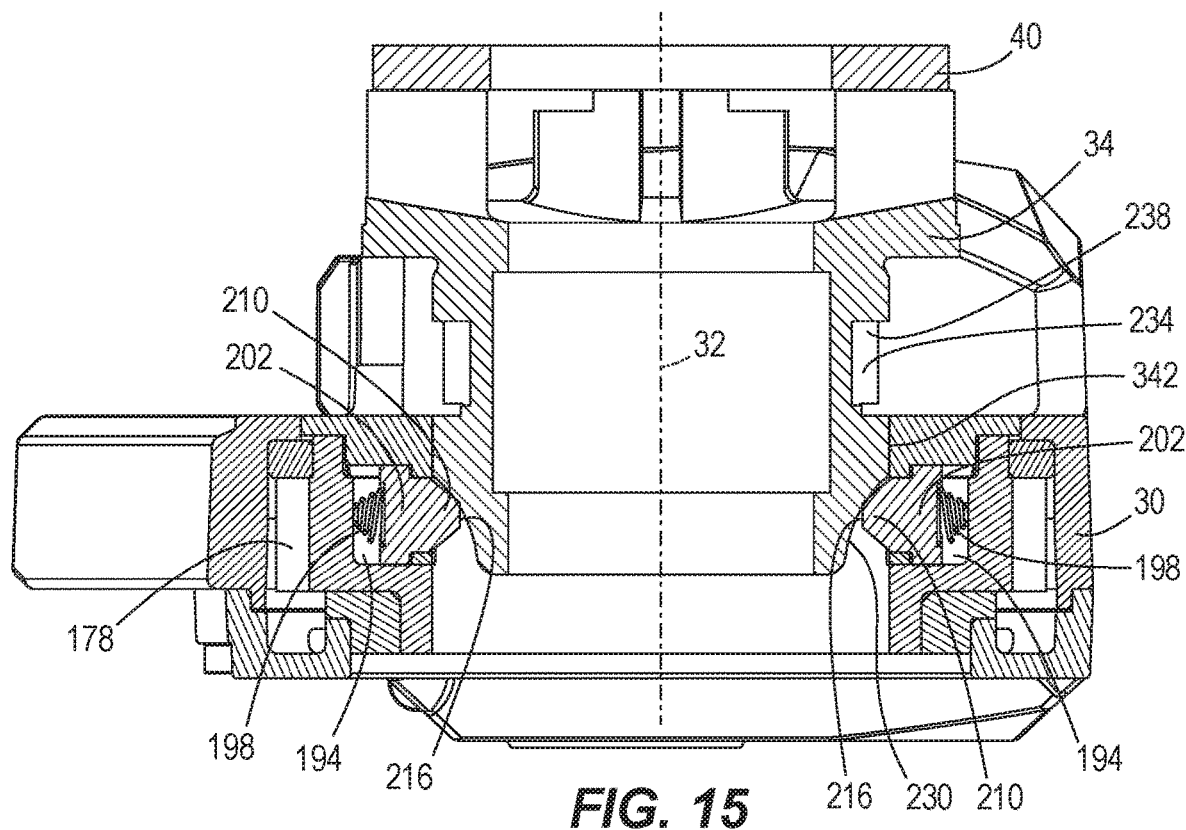
FIG. 15 is a cross-sectional view of the die of FIG. 14 being inserted into the die holder of FIG. 10.
Figure 16:
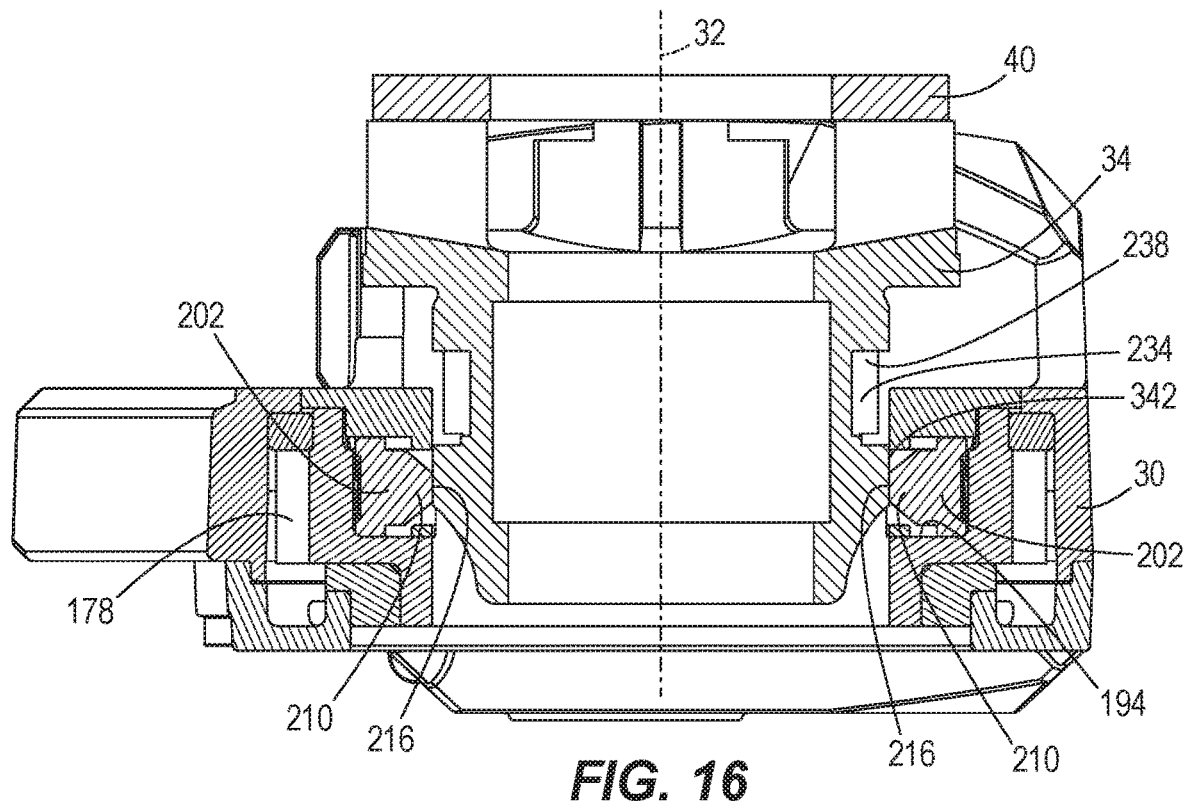
FIG. 16 is a cross-sectional view of the die of FIG. 14 being inserted into the die holder of FIG. 10.
Figure 17:
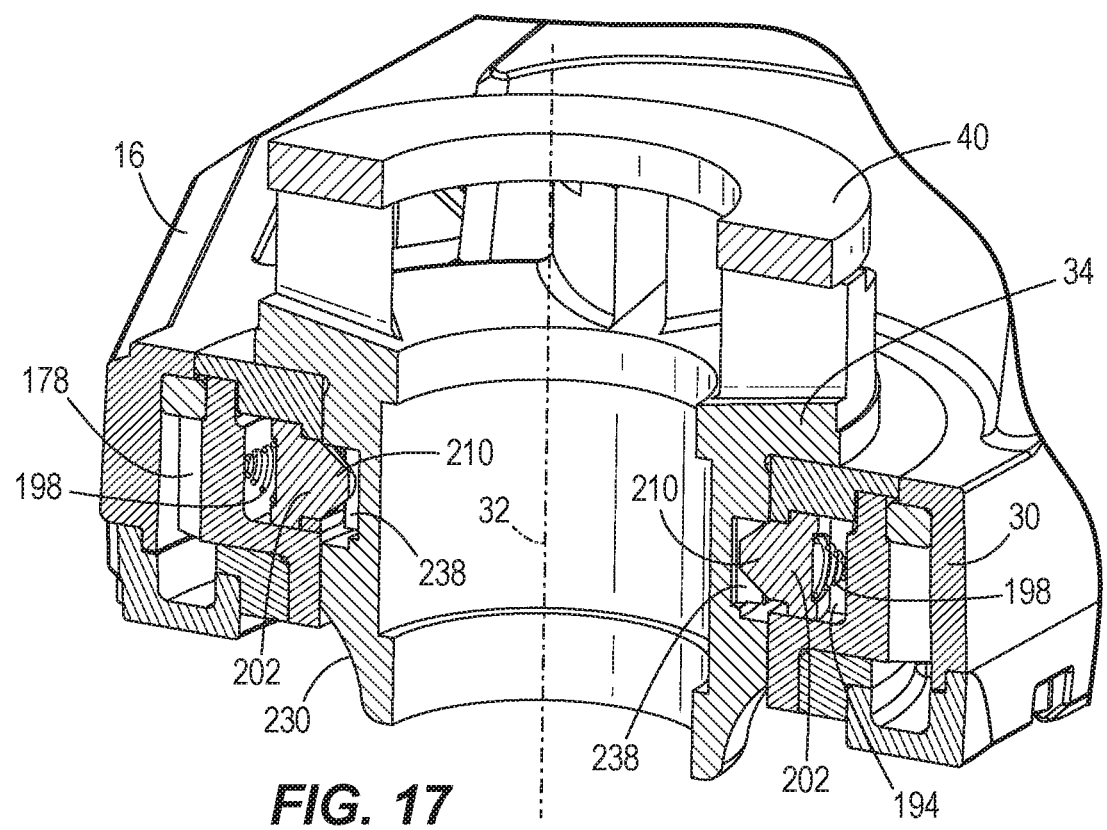
FIG. 17 is a cross-sectional view of the die of FIG. 14 fully inserted into the die holder of FIG. 10.

In operation, an operator inserts the die 34 into the die holder 30 along the rotational axis 32, causing the curvilinear edge 230 to begin pressing against the key portions 210 of the keys 202, thus forcing the keys 202 away from the rotational axis 32 against the biasing force of springs 198, as shown in FIG. 15. As the operator continues inserting the die 34, the cylindrical portion 342 of the die 34 comes into contact with the nose 216 of the key portion 210, forcing the keys 202 completely within the recesses 194, as shown in FIG. 16. Once the recessed portion 234 of the die 34 has become aligned with the recesses 194 along the rotational axis 32, the keys 202 rebound due to the biasing force of springs 198 into respective recesses 238, as shown in FIGS. 17 and 18.

The operator then arranges the die 34 on a pipe to be threaded and presses against the face 38 of the non-rotating projection 36 of FIG. 1, or projection 40 of the die 34, in the direction of the rotational axis 32. The operator then presses trigger 50 to activate motor 22, which transfers torque through the transmission 26 to the output gear 50, thus causing the die holder 30 to begin rotating. As the die holder 30 rotates, torque is transferred from the die holder 30, through the keys 202, and to the die 34 via the side faces 218 of the key portions 210 of the torque keys 202 being arranged in the recesses 238 (as shown in FIG. 18), thus causing the die 34 to rotate. Because of the application of force against projection 36 or 40, the die 34 begins moving along the pipe to cut threads on the pipe. Once the pipe-threading operation has been completed, the operator may remove the die 34 from the pipe, and then remove the die 34 from the die holder by pulling the die 34 from the die holder 30 in a direction opposite of which it was inserted. As the die 34 is removed, the cylindrical portion 342 slides along the edges 214 of the key portions 210, thus forcing the keys 210 into the recesses 194, thereby unlocking the die 34 from the die holder 30.

Figure 19:
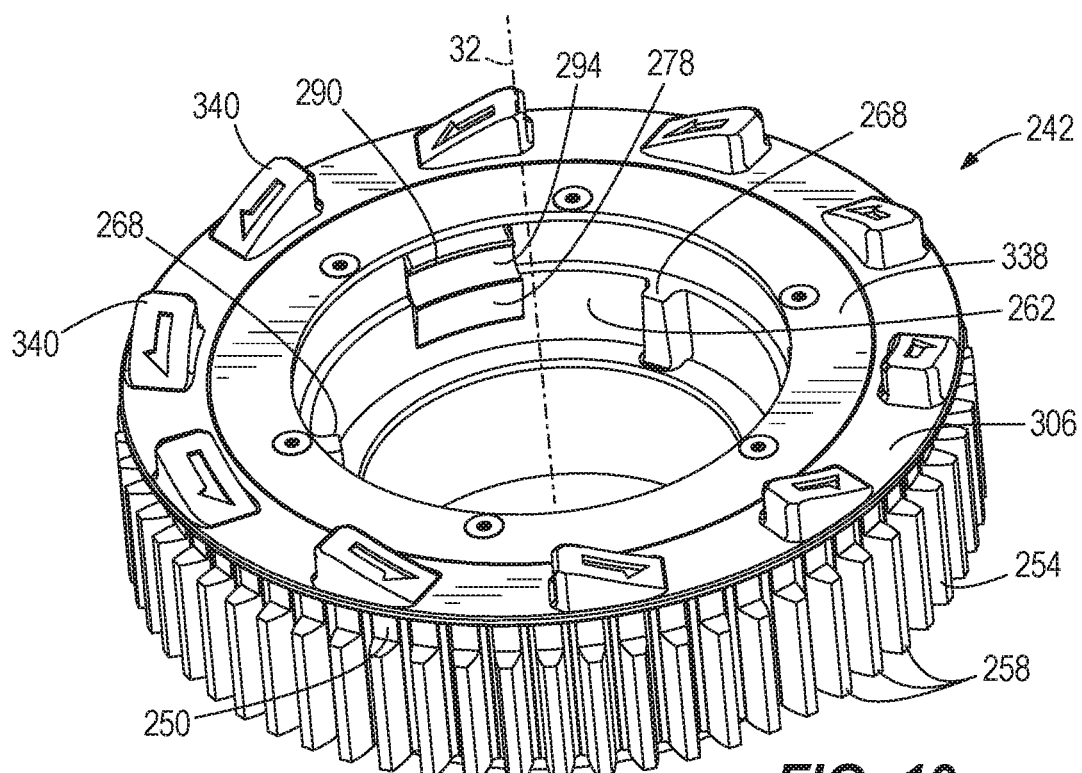
FIG. 19 is a perspective view of another embodiment of a die holder for use with the pipe threader of FIG. 1.
Figure 20:
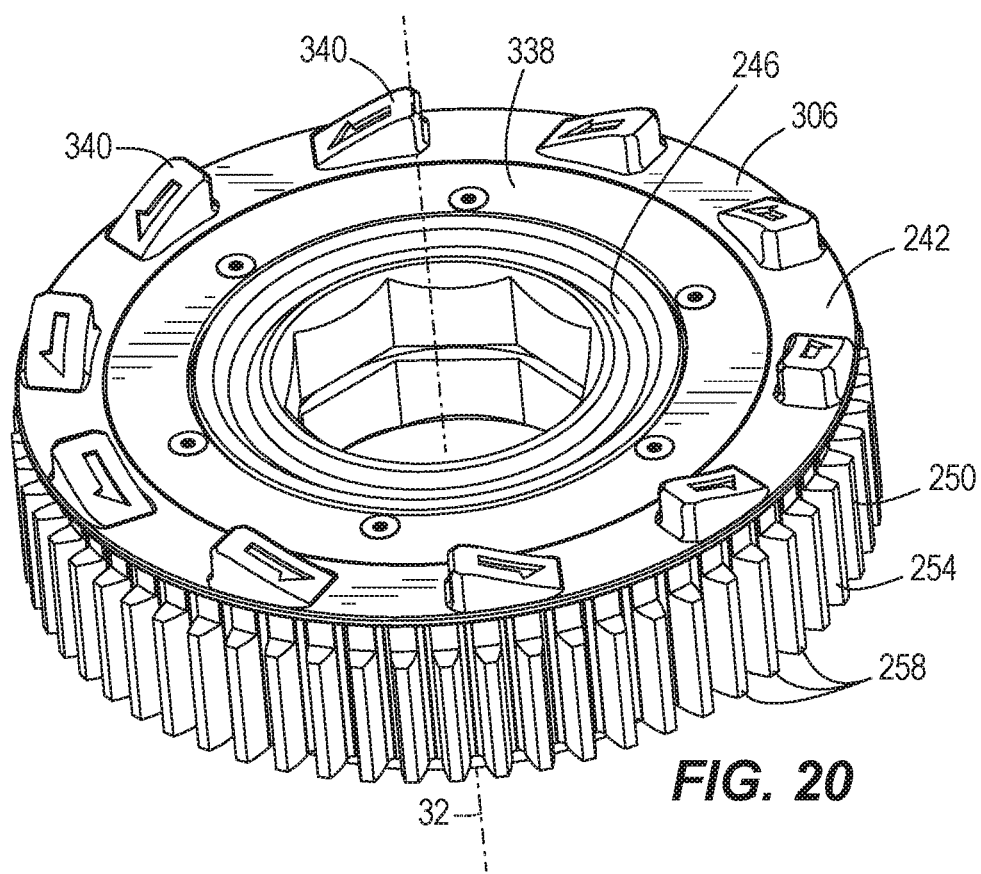
FIG. 20 is a perspective view of the die holder of FIG. 19 with a die inserted.
Figure 21:
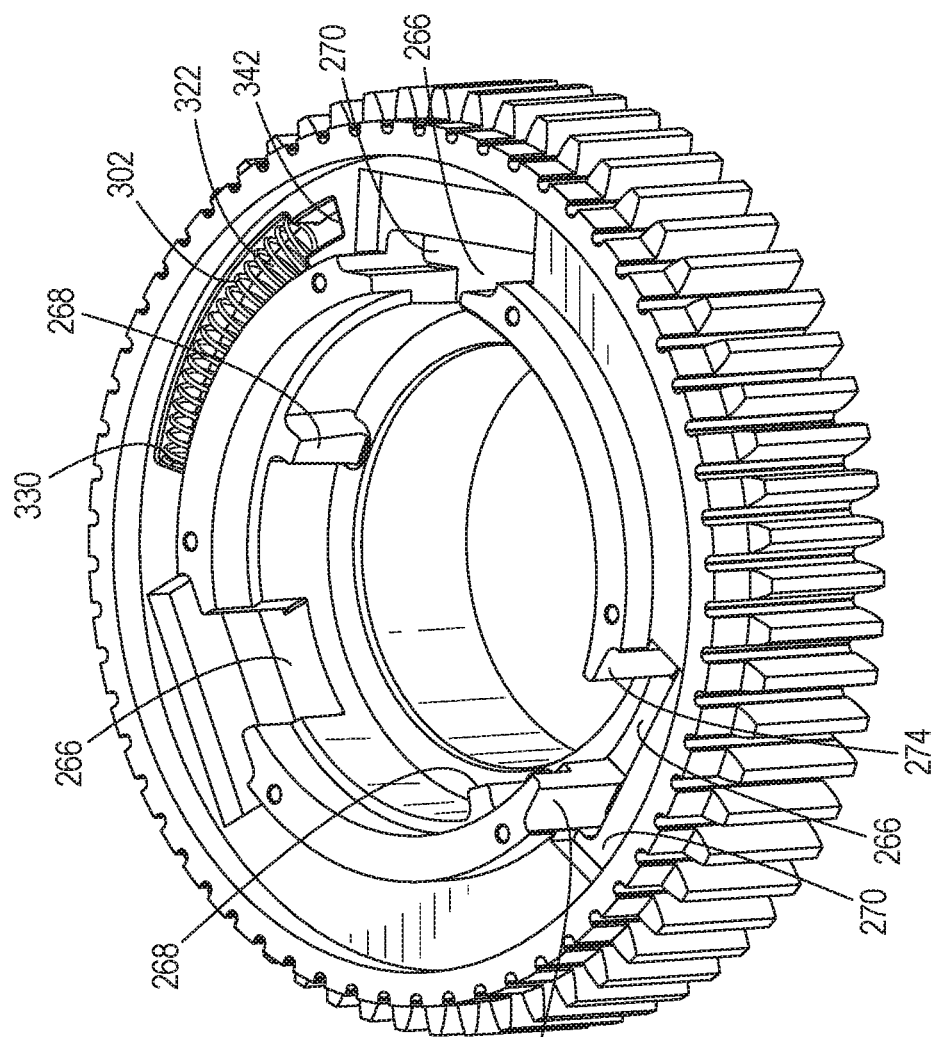
FIG. 21 is a perspective view of a gear member of the die holder of FIG. 20.
Figure 22:
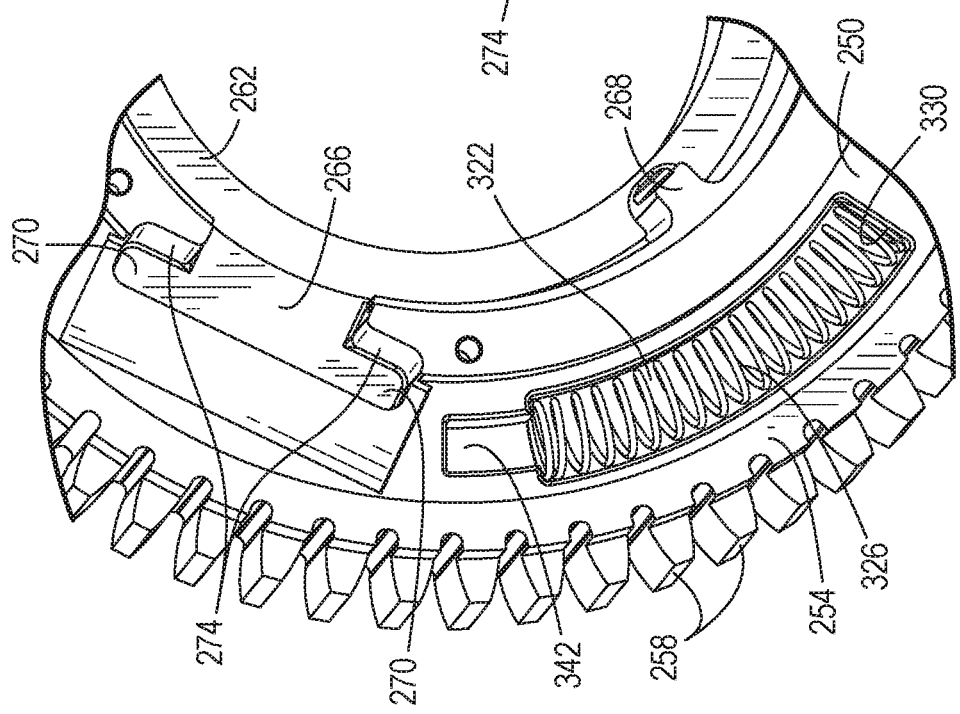
FIG. 22 is a top plan view of the gear member of FIG. 21.
Figure 23:
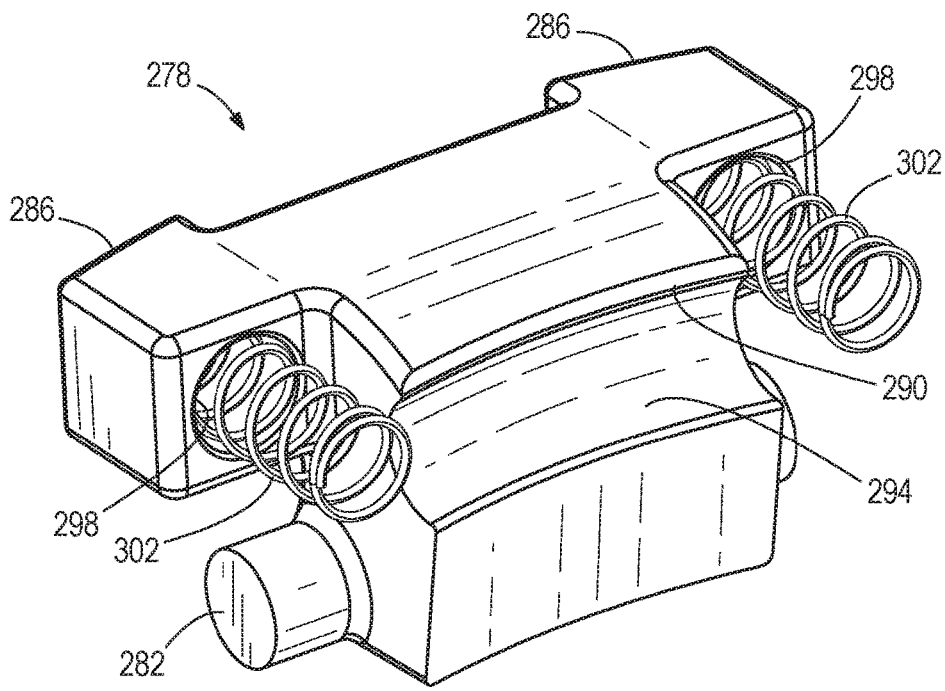
FIG. 23 is a perspective view of a lock member of the die holder of FIG. 19.

Another embodiment of a die holder 242 for holding a die 246 (FIG. 26) is shown in FIGS. 19-25. As shown in FIGS. 19-21, the die holder 242 includes a gear member 250 including an outer circumference 254 with a plurality of teeth 258 that engage with the teeth 186 of the output gear 58, such that the output gear 58 may transmit torque from the drive assembly 18 to the die holder 242. The gear member 250 also includes an inner circumference 262 defining plurality of slots 266 (FIG. 21) and including radially inward-extending legs 268. As shown in FIGS. 21 and 22, the slots 266 include axle recesses 270 and spring faces 274. As shown in FIG. 19, a lock member 278 is arranged in each slot 266. As shown in FIG. 23, each lock member 278 includes a pair of axles 282, a pair of shoulders 286, a lip 290 on the edge of a groove 294, and a pair of recesses 298 in which compression springs 302 are arranged.

Figure 24:
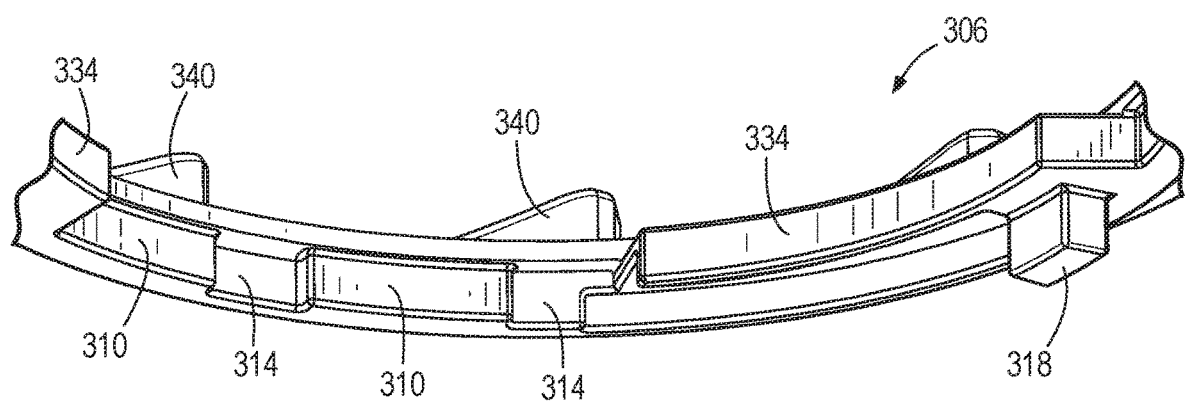
FIG. 24 is an enlarged perspective view of a lock ring of the die holder of FIG. 19.
Figure 25:
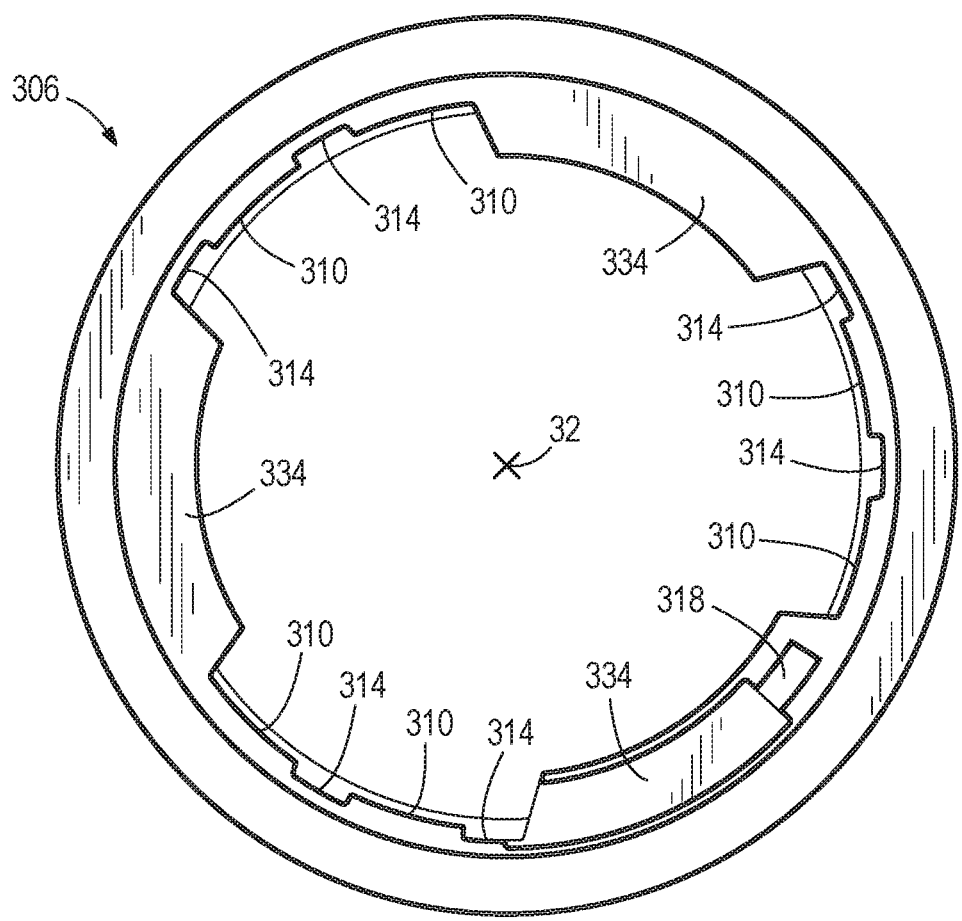
FIG. 25 is a bottom plan view of a lock ring of the die holder of FIG. 19.

As shown in FIGS. 19, 20, 24, and 25 the die holder 242 also includes a lock ring 306 that is rotatable relative to the gear member 250, as explained below. As shown in FIG. 24, the lock ring 306 include contact surfaces 310 and adjacent recesses 314. The lock ring 306 also includes a protrusion 318 extending in a direction parallel to the rotational axis 32 into a channel 322 defined in the gear member 250, as shown in FIG. 22. A compression spring 326 is arranged between the protrusion 318 and a spring seat 330 in the channel 322, such that the lock ring 306 is biased in a first rotational direction (e.g. clockwise as viewed in FIGS. 19 and 20) with respect to the gear member 250. The lock ring 306 includes a plurality of radially inward-protruding ledges 334 (FIG. 24) set underneath a retaining ring 338 fastened to gear member 250 (FIG. 20), thus preventing the lock ring 306 from displacing axially with respect to gear member 250. The lock ring 306 also includes a plurality of fins 340, permitting an operator to rotate the lock ring 306 with respect to the gear, as described below.

During assembly, the lock members 278 are arranged in the slots 266 by positioning the axles 282 in the axle recesses 270, such that the lock members 278 may pivot in the slots about the axles 282. The compression springs 302 are set against the spring faces 174, such that the shoulders 286 are biased away from the rotational axis 32. When the lock ring 306 is in a first rotational position, in which spring 326 is fully extended and biasing the protrusion 318 into a notch 342 in the channel 322, the shoulders 286 are biased against the contact surfaces 310, such that the lock members 278 are moved to a first position, in which they pivot inward toward the rotation axis 32. When the lock ring 306 is rotated (counterclockwise as viewed in FIGS. 19 and 20) to a second rotational position, in which the spring 326 has been compressed against spring seat 330 by the protrusion 318, the shoulders 286 are biased into the recesses 314, such that the lock members 278 are moved to a second position, in which they pivot outward, away from the rotational axis 32.

Figure 26:
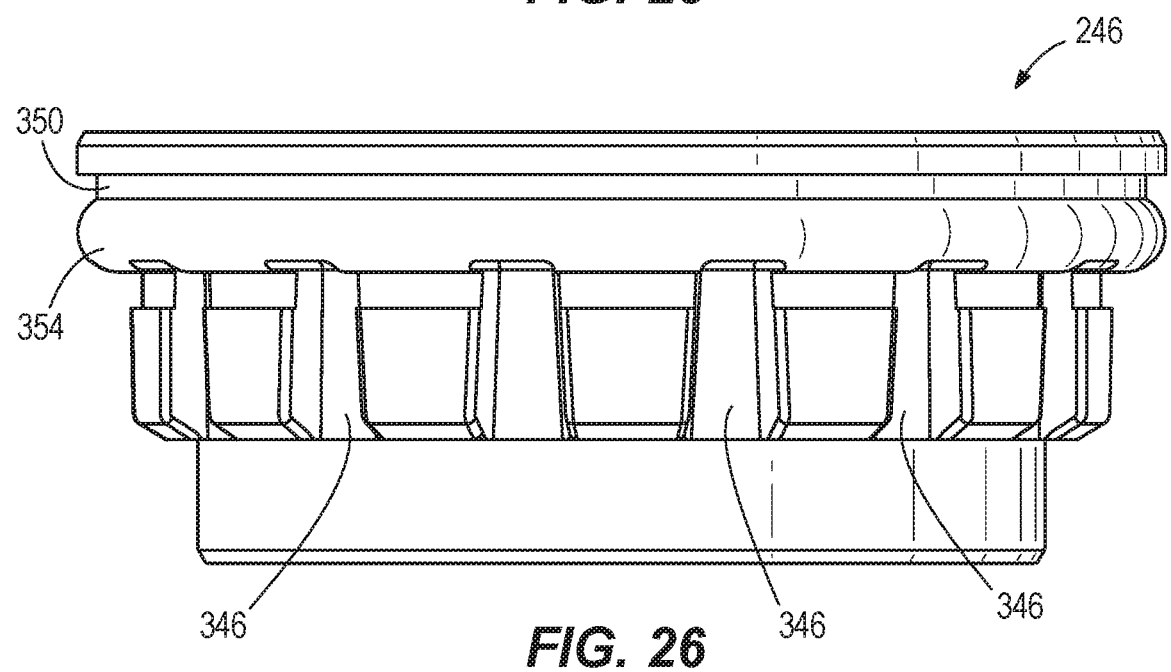
FIG. 26 is a plan view of a die for use with the die holder of FIG. 19.

As shown in FIG. 26, the die 246 includes plurality of axially extending recesses 346, a circumferential channel 350, and a lip 354 in between the channel 350 and recesses 346.

In operation, in order to insert die 246 into die holder 342, an operator must first rotate the lock ring 306 from the first rotational position to the second rotational position, causing each lock member 278 to move from the first position to the second position. While holding the lock ring 306 in the second rotational position, the operator may then insert the die 246 into the die holder 342, in a manner such that the recesses 346 align with the legs 268, thereby locking the die 246 for rotation with the die holder 342.

As the die 246 is inserted, the lip 354 of the die 246 contacts the groove 294 of each lock member 278, thus pivoting the lock member 278 from the second position to the first position, in which the lip 290 of the each lock member 278 is arranged in the circumferential channel 350 of the die 246. The operator may then release the lock ring 306, allowing the compression spring 326 to bias the lock ring 306 back to the first rotational position, in which the shoulders 286 of the lock members 278 are biased against the contact surfaces 310, thereby preventing the lock members 278 from pivoting radially outward. Thus, because the lip 290 of each lock member 278 is arranged in the circumferential channel 350 and the lip 354 of the die 346 is arranged in the groove 294 of each lock member, the die 246 is axially constrained within the die holder 342, preventing the die 246 from moving along the rotational axis 32 with respect to the die holder 342 during operation.

To remove the die 246 from the die holder 242, the operator rotates the lock ring 306 from the first rotational position to the second rotational position. And, while holding the lock ring 306 in the second rotational position 306, removes the die 246 in an opposite direction from which it was inserted. As the die 246 is removed, the lip 354 of the die catches the lip 290 of each lock member 278, and because the lock ring 306 is in the second rotational position, the lock members 278 are allowed to pivot outward such that that their shoulders 286 are received in the recesses 314 of the lock ring 306.

Figure 27:
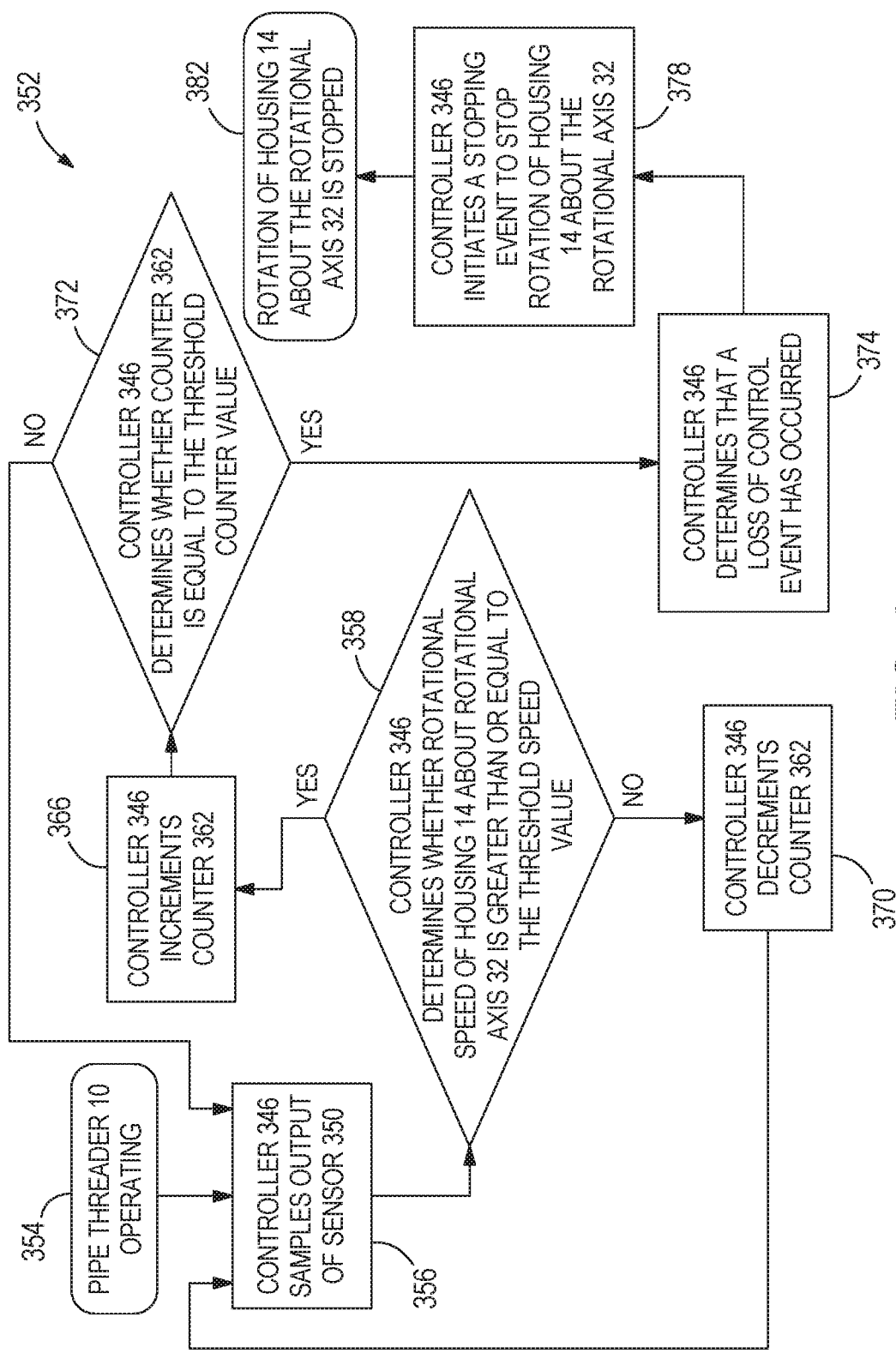
FIG. 27 illustrates a method of operating the pipe threader of FIG. 1.

FIG. 27 schematically illustrates a method 352 of operating the pipe threader 10, with specific reference to the functions of the controller 346 and sensor 350 during operation of the pipe threader 10. At step 354, the pipe threader 10 is operating and cutting threads into a pipe with die 34. At step 354, the die holder 30 is in an activated state, in which it is receiving torque from the motor 22. As shown step 356, the controller 346 samples the output of the sensor 350 to measure the rotational speed (e.g., in degrees of rotation per second) of the housing 14 about the rotational axis 32. In some embodiments, the controller 346 samples the rotational speed of the housing 14 every ten milliseconds, but in other embodiments this sampling frequency can be higher or lower. For example, in some embodiments, the controller 346 samples the rotational speed of the housing every millisecond.

As shown at step 358, after taking the sample at step 354, the controller 346 compares the sampled rotational speed of the housing 14 with a threshold speed value representing a threshold rotational speed. In some embodiments, the threshold rotational speed is 100 degrees per second. If the rotational speed of the housing 14 is greater than or equal to the threshold speed value, a counter 362 (shown schematically as a broken line box within controller 346 in FIGS. 1 and 2) is incremented by a value (e.g., 1), as shown at step 366. If, however, the rotational speed of the housing 14 is less the threshold speed value, the counter 362 is decremented by the same value (e.g., 1), as shown at step 370. If the counter 362 was already at zero prior to entering step 370, the counter 362 simply remains at zero. The counter 362 never has a value less than zero. After decrementing the counter at step 370, the process returns to step 356, and the controller 346 samples the output of the sensor 350.

If the counter was incremented by the value (e.g., 1) at step 366, the controller 346 then checks to determine whether the counter 362 is equal to a threshold counter value (e.g., 10), as shown at step 372. In the embodiment illustrated in FIG. 27, the increment and decrement value is 1 and the threshold counter value is 10, but in other embodiments these values can be changed. For example, in some embodiments, the threshold counter value is 24. If the counter 362 is less than the threshold value (e.g., 10), the process returns to step 356, and the controller 346 samples the output of the sensor 350. If the counter 362 is equal to the threshold value (e.g., 10), the controller 346 determines that a loss of control event has occurred, as shown at step 374. In response, the controller 362 initiates a stopping event at step 378 to stop the rotation of housing 14 about the rotational axis 32. In some embodiments, the stopping event is deactivation of the motor 22 (i.e., switching the motor 22 from an activated state to a deactivated state). In other embodiments, instead of or in addition to deactivating the motor 22, the stopping event is activation of a clutch 380 (shown schematically in FIG. 3) in the drive assembly 18 or application of a brake 381 (shown schematically in FIG. 3) in the drive assembly 18 or at the die holder 30 to stop rotation of the housing 14 about the rotational axis 32. Thus, after initiation of the stopping event at step 378, while the rotational inertia of the pipe threader 10 will momentarily keep the pipe threader 10 rotating about the rotational axis 32, the housing 14 will eventually stop rotating about the rotational axis 32 as shown at step 382. At step 382, the die holder 30 has been switched from the activated state to a deactivated state, in which it is no longer receiving torque from the motor 22. Three illustrative examples are provided below to demonstrate the functionality of the loss of control detection mechanism 344.

In a first example of the method 352, the controller 346 detects that the rotational speed of the housing 14 is continuously above the threshold speed value for 10 consecutive sampling intervals (i.e., 100 milliseconds (ms)), and the counter 362 is increased to 10. The controller 346 recognizes that the counter equals the threshold counter value (10) and determines that a loss of control event has occurred. The controller 346 thus initiates the stopping event.

In a second example of the method 352, the controller 346 detects that the rotational speed of the housing 14 is above the threshold speed value for seven consecutive sampling intervals (i.e., 70 ms), and the counter is increased to 7. The next three consecutive samples (over the next 30 ms) of the sensor 350, however, indicate that the rotational speed of the housing 14 is below the threshold speed value. The counter 362 is consecutively decremented three times, changing the value of the counter 362 from 7 to 4. The next five samples (over the next 50 ms) of the sensor 350, indicate that the rotational velocity of the housing 14 is above the threshold speed value, and the counter 362 is incremented five times, moving the value of the counter 362 from 4 to 9. Thereafter, however, the controller 346 detects that the rotational velocity of the housing 14 is below the threshold speed value. In this example, the counter 362 never reaches the threshold counter value (10) and thus, a loss of control event is never recognized by the controller 346 and a stopping event is never initiated.

In a third example of the method 352, the controller 346 detects that the rotational velocity of the housing 14 is above the threshold speed value for seven consecutive sampling intervals (i.e., 70 ms), and the counter 362 is incremented to 7. The next three samples (over the next 30 ms) of the sensor 350, however, indicate that the rotational velocity of the housing 14 is below the threshold speed value. The counter is decremented three times, changing the value of the counter 362 from 7 to 4. The next six samples (over the next 60 ms) of the sensor 350, indicate that the rotational velocity of the housing 14 is above the threshold speed value. The counter 362 is incremented six times, changing the value of the counter 362 from 4 to 10. The controller 346 now recognizes that the counter 362 equals the threshold counter value (10) and determines that a loss of control event has occurred. The controller 346 thus initiates the stopping event at step 382.

In the method 352, by incrementing and decrementing the counter 362, the loss of control detection mechanism 344 substantially reduces false positives (determining a loss of control event at step 374 when no loss of control event has occurred) and false negatives (failing to determine that a loss of control event has occurred when a loss of control event has occurred).

Figure 28:
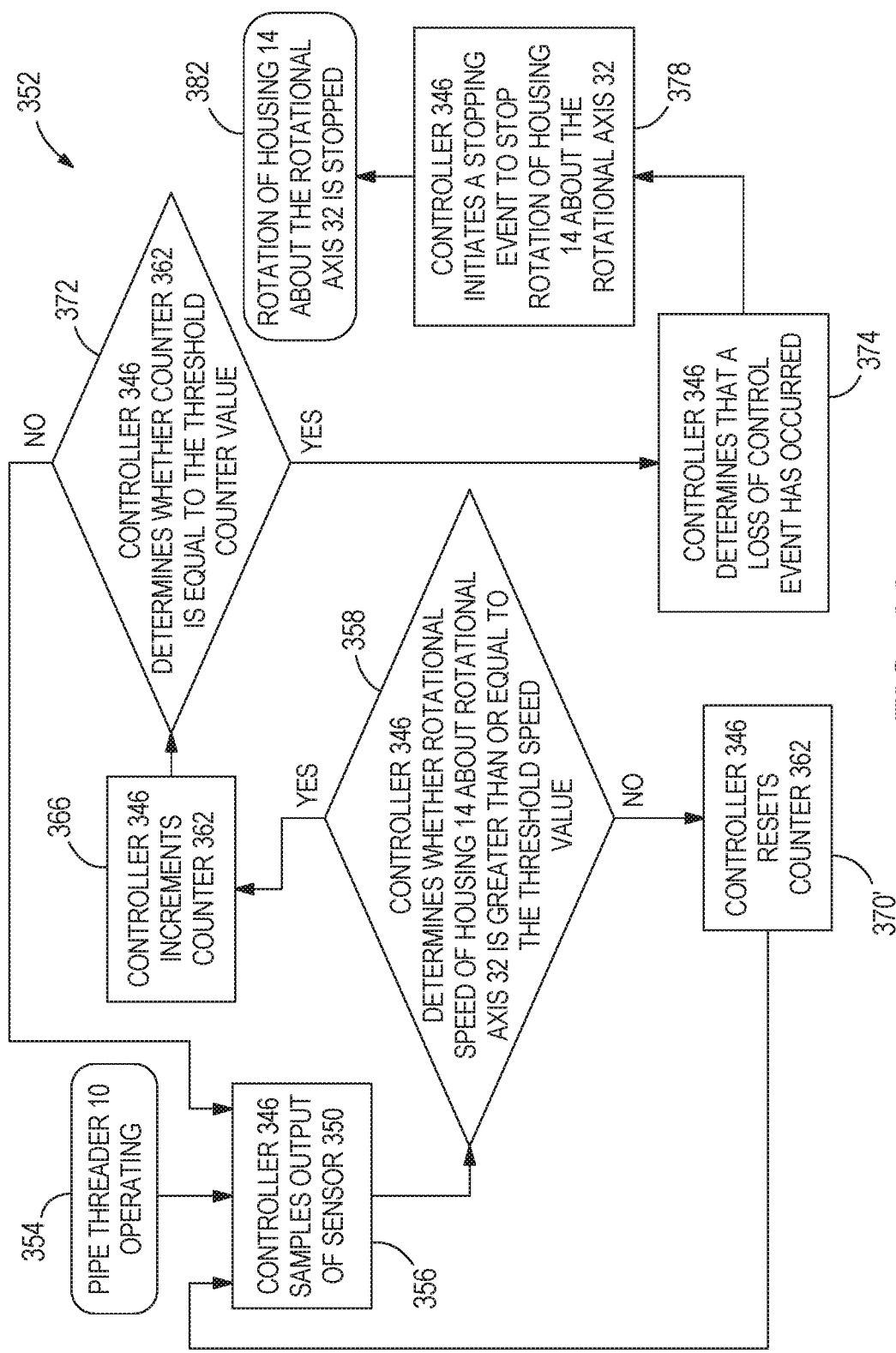
FIG. 28 illustrates a different method of operating the pipe threader of FIG. 1.

FIG. 28 schematically illustrates a different method 386 of operating the pipe threader 10, with specific reference to the functions of the controller 346 and sensor 350 during operation of the pipe threader 10. The method 386 is identical to the method 352, except instead of decrementing the counter at step 370 as in the method 352, in method 386 the controller 346 resets the counter 362 at a step 370'. In some embodiments, at step 370' the controller 346 resets the counter 362 to a zero value. In other embodiments, the controller 346 resets the counter 362 to a non-zero value, such as one.

At step 354, the pipe threader 10 is operating and cutting threads into a pipe with die 34. At step 354, the die holder 30 is in an activated state, in which it is receiving torque from the motor 22. As shown step 356, the controller 346 samples the output of the sensor 350 to measure the rotational speed (e.g., in degrees of rotation per second) of the housing 14 about the rotational axis 32. In some embodiments, the controller 346 samples the rotational speed of the housing 14 every millisecond, but in other embodiments this sampling frequency can be higher or lower. For example, in some embodiments, the controller 346 samples the rotational speed of the housing every ten milliseconds.

As shown at step 358, after taking the sample at step 356, the controller 346 compares the sampled rotational speed of the housing 14 with a threshold speed value representing a threshold rotational speed. In some embodiments, the threshold rotational speed is 100 degrees per second. If the rotational speed of the housing 14 is greater than or equal to the threshold speed value, a counter 362 (shown schematically as a broken line box within controller 346 in FIGS. 1 and 2) is incremented by a value (e.g., 1), as shown at step 366. If, however, the rotational speed of the housing 14 is less the threshold speed value, the counter 362 is reset, as shown at step 370'. In some embodiments, the counter 362 is reset to a zero value. If the counter 362 was already at zero prior to entering step 370', the counter 362 simply remains at zero. The counter 362 never has a value less than zero.

After resetting the counter 362 to zero at step 370', the process returns to step 356, and the controller 346 samples the output of the sensor 350.

If the counter 362 was incremented by the value (e.g., 1) at step 366, the controller 346 then checks to determine whether the counter 362 is equal to a threshold counter value (e.g., 24), as shown at step 372. In the embodiment illustrated in FIG. 28, the increment value is 1 and the threshold counter value is 24, but in other embodiments these values can be changed. For example, in some embodiments, the threshold counter value is 10. If the counter 362 is less than the threshold value (e.g., 24), the process returns to step 356, and the controller 346 samples the output of the sensor 350. If the counter 362 is equal to the threshold value (e.g., 24), the controller 346 determines that a loss of control event has occurred, as shown at step 374. In response, the controller 362 initiates a stopping event at step 378 to stop the rotation of housing 14 about the rotational axis 32. In some embodiments, the stopping event is deactivation of the motor 22 (i.e., switching the motor 22 from an activated state to a deactivated state). In other embodiments, instead of or in addition to deactivating the motor 22, the stopping event is activation of a clutch 380 (shown schematically in FIG. 3) in the drive assembly 18 or application of a brake 381 (shown schematically in FIG. 3) in the drive assembly 18 or at the die holder 30 to stop rotation of the housing 14 about the rotational axis 32. Thus, after initiation of the stopping event at step 378, while the rotational inertia of the pipe threader 10 will momentarily keep the pipe threader 10 rotating about the rotational axis 32, the housing 14 will eventually stop rotating about the rotational axis 32 as shown at step 382. At step 382, the die holder 30 has been switched from the activated state to a deactivated state, in which it is no longer receiving torque from the motor 22. Three illustrative examples are provided below to demonstrate the functionality of the loss of control detection mechanism 344.

In a first example of the method 386, the controller 346 detects that the rotational speed of the housing 14 is continuously above the threshold speed value for 24 consecutive sampling intervals (i.e., 24 milliseconds (ms)), and the counter 362 is increased to 24. The controller 346 recognizes that the counter 362 equals the threshold counter value (24) and determines that a loss of control event has occurred. The controller 346 thus initiates the stopping event.

In a second example of the method 386, the controller 346 detects that the rotational speed of the housing 14 is above the threshold speed value for twenty-three consecutive sampling intervals (i.e., 23 ms), and the counter is increased to 23. The next sample (over the next ms) of the sensor 350, however, indicates that the rotational speed of the housing 14 is below the threshold speed value. The counter 362 is thus reset to zero at step 370'. The next twenty-three samples (over the next 23 ms) of the sensor 350, indicate that the rotational velocity of the housing 14 is above the threshold speed value, and the counter 362 is incremented twenty-three times, moving the value of the counter 362 from 0 to 23. Thereafter, however, the controller 346 detects that the rotational velocity of the housing 14 is below the threshold speed value, again resetting the counter 362 to zero at step 370'. In this example, the counter 362 never reaches the threshold counter value (24) and thus, a loss of control event is never recognized by the controller 346 and a stopping event is never initiated.

In a third example of the method 386, the controller 346 detects that the rotational velocity of the housing 14 is above the threshold speed value for seven consecutive sampling intervals (i.e., 7 ms), and the counter 362 is incremented to 7. The next three samples (over the next 3 ms) of the sensor 350, however, indicate that the rotational velocity of the housing 14 is below the threshold speed value. The counter is thus reset to zero at step 370' after the first of the three consecutive samples below the threshold speed value, and then maintained at zero for the following two samples below the threshold speed value. The next twenty-four samples (over the next 24 ms) of the sensor 350 indicate that the rotational velocity of the housing 14 is above the threshold speed value. The counter 362 is incremented twenty-four times, changing the value of the counter 362 from 0 to 24. The controller 346 now recognizes that the counter 362 equals the threshold counter value (24) and determines that a loss of control event has occurred. The controller 346 thus initiates the stopping event at step 382.

In comparison with the method 352, the method 386 requires that there be a consecutive number of samples equal to the threshold counter value that are above the threshold speed value in order to trigger the stopping event at step 382. Thus, the stopping event will be initiated less frequently in the method 386 than in the method 352, because the counter 362 is always reset by the controller 346 at step 370' when the sensor 350 indicates that the rotational velocity of the housing 14 is below the threshold speed value.

Figure 29:
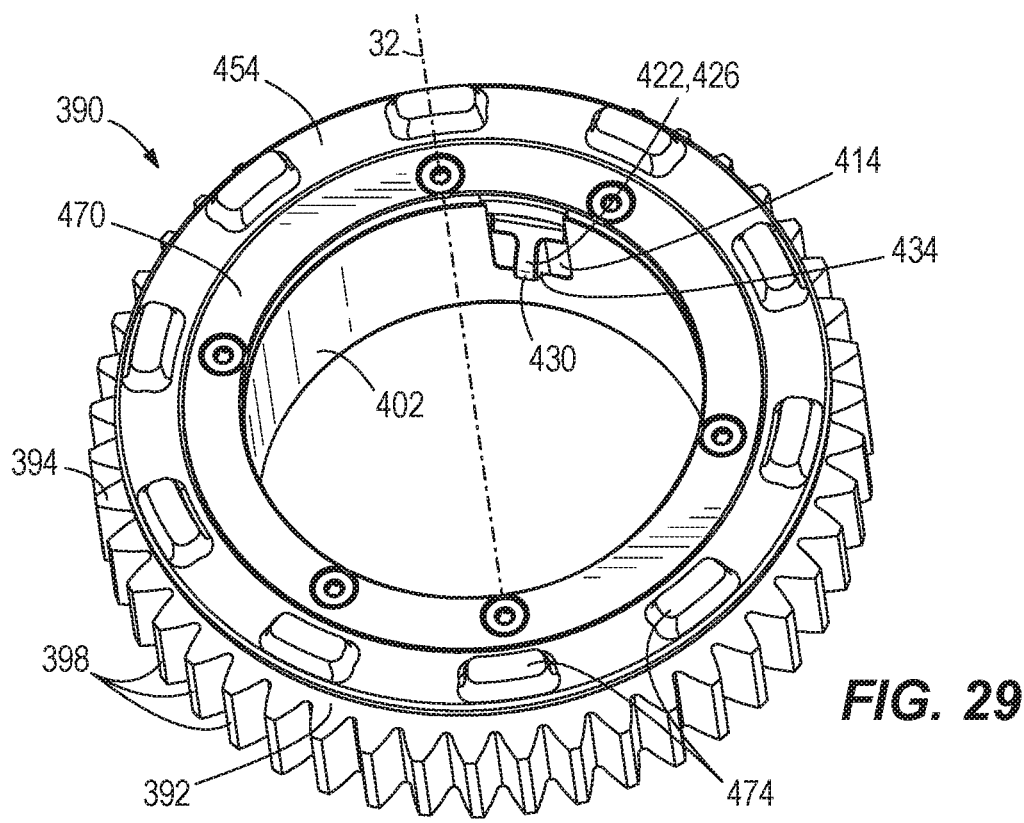
FIG. 29 is a perspective view of another embodiment of a die holder for use with the pipe threader of FIG. 1.
Figure 30:
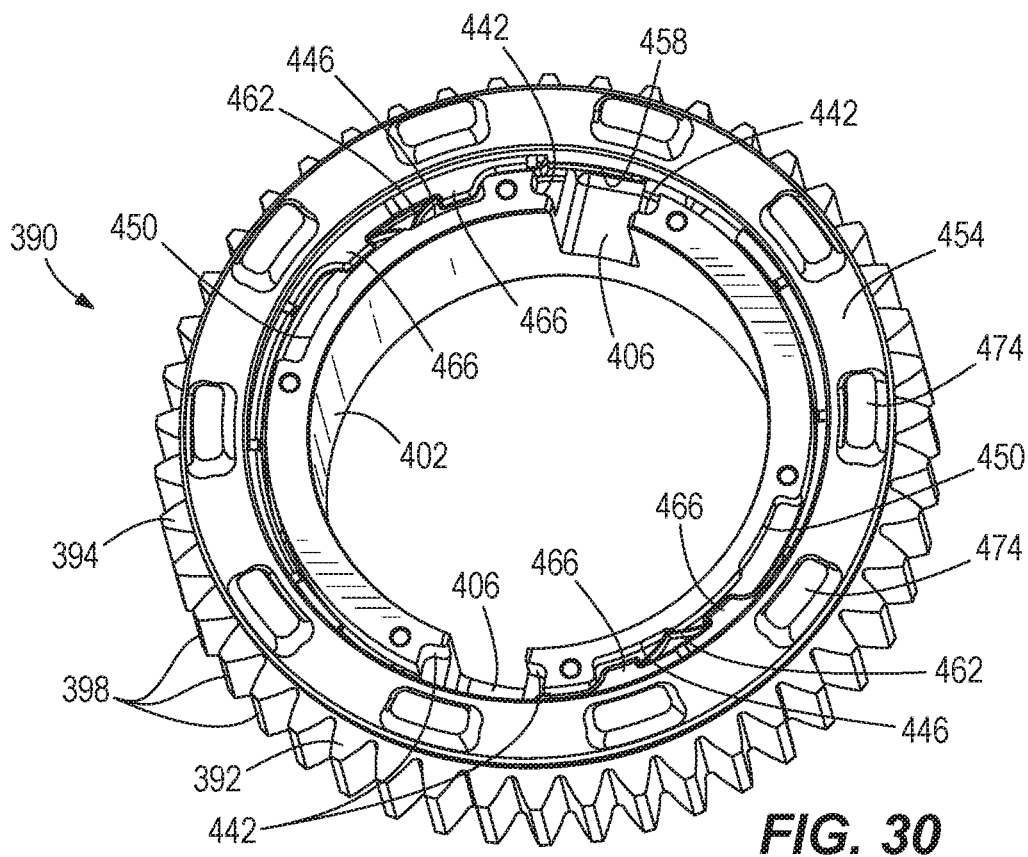
FIG. 30 is a perspective view of the die holder of FIG. 29, with portions removed.
Figure 31:
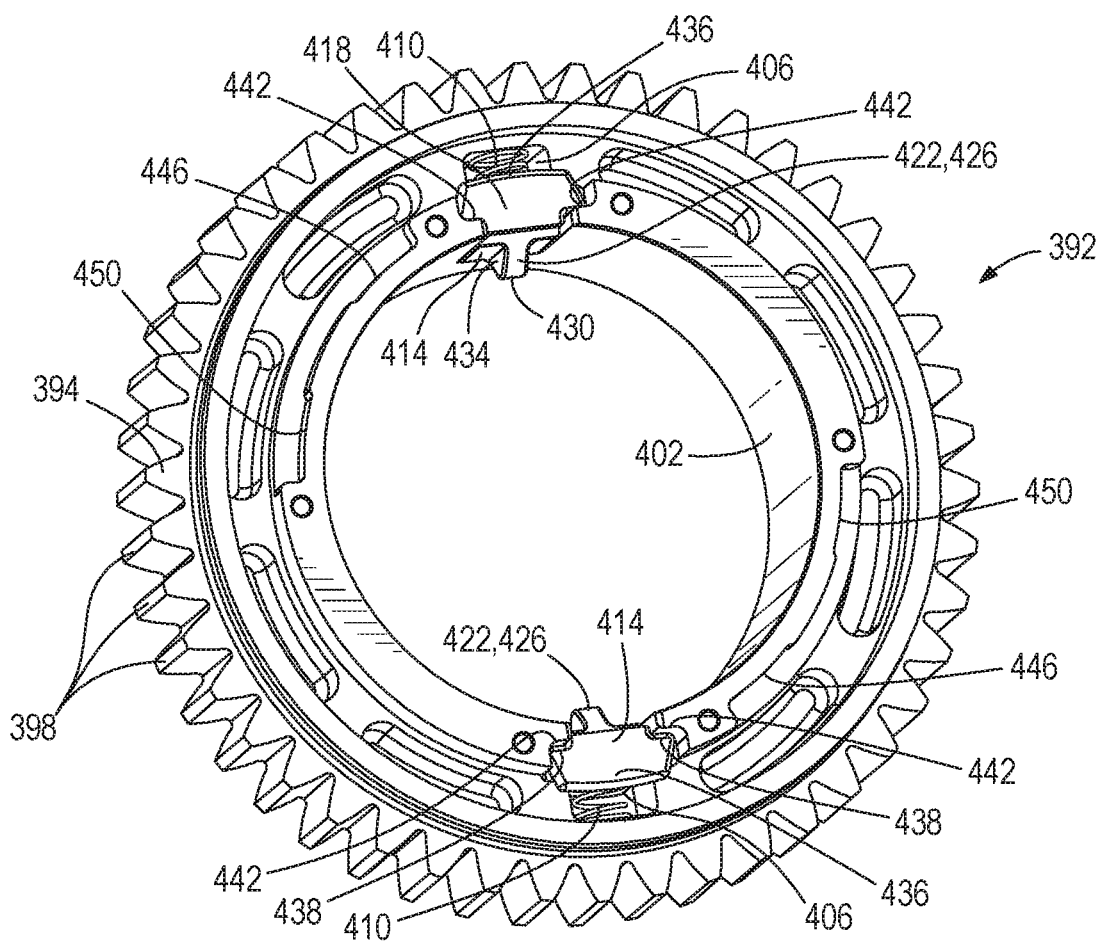
FIG. 31 is a perspective view of the die holder of FIG. 29, with portions removed.

FIGS. 29-34 illustrate another embodiment of a die holder 390 for use with the pipe threader 10 for holding the die 34 of FIG. 14. The die holder 390 includes a gear member 392 having an outer circumference 394 with teeth 398 that are engaged with teeth 186 of the output gear 58, such that the output gear 58 may transmit torque from the drive assembly 18 to the die holder 390. The gear member 392 also includes an inner circumference 402 defining two key recesses 406 arranged opposite each other, as shown in FIG. 30. As shown in FIG. 31, a compression spring 410 and a torque key 414 are arranged in each key recess 406, such that the torque keys 414 are biased radially inward toward the rotation axis 32 (FIG. 29).

Figure 33:
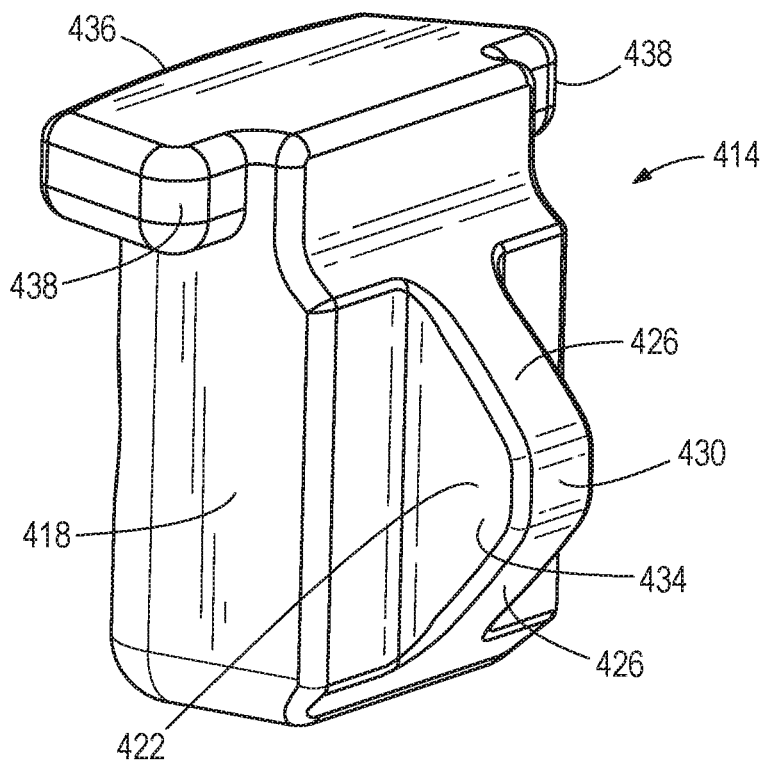
FIG. 33 is a perspective view of a key of the die holder of FIG. 29.
Figure 34:
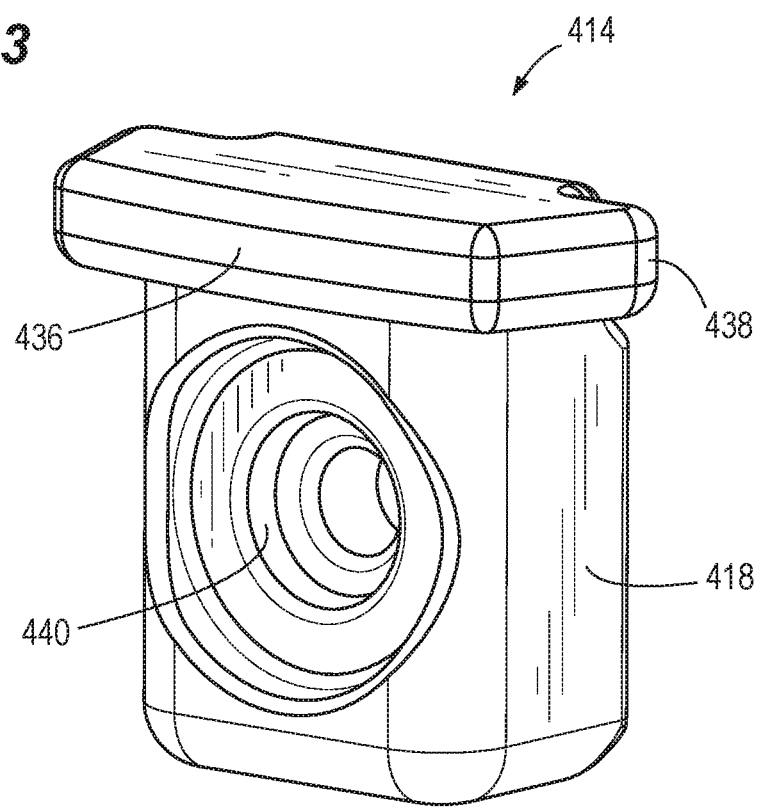
FIG. 34 is a reverse perspective view of the key of FIG. 33

As shown in FIGS. 33 and 34, each torque key 414 has a body 418 and a key portion 422 extending radially inward from the body 418. The key portion 422 includes two edges 426 obliquely oriented with respect to the rotational axis 32, a flat nose 430 between the two edges 426, and two opposite side faces 434. A shoulder 436 extends radially outward from the body 418 and includes a pair of opposite wings 438 that extend laterally outward from the body 418. As shown in FIG. 34, on the side of the body 418 opposite the key portion 422, a spring recess 440 is defined in the body 418 to receive the compression spring 410.

As shown in FIGS. 30 and 31, the gear member 392 includes a pair of ledges 442 adjacent of each key recess 406. As the torque keys 414 are biased towards the rotation axis 32 by the springs 410, the wings 438 abut the ledges 442, thus constraining the keys 414 within the gear member 392. With continued reference to FIGS. 30 and 31, the gear member 392 also includes a pair of first detent recesses 446 and a pair of second detent recesses 450.

Figure 32:
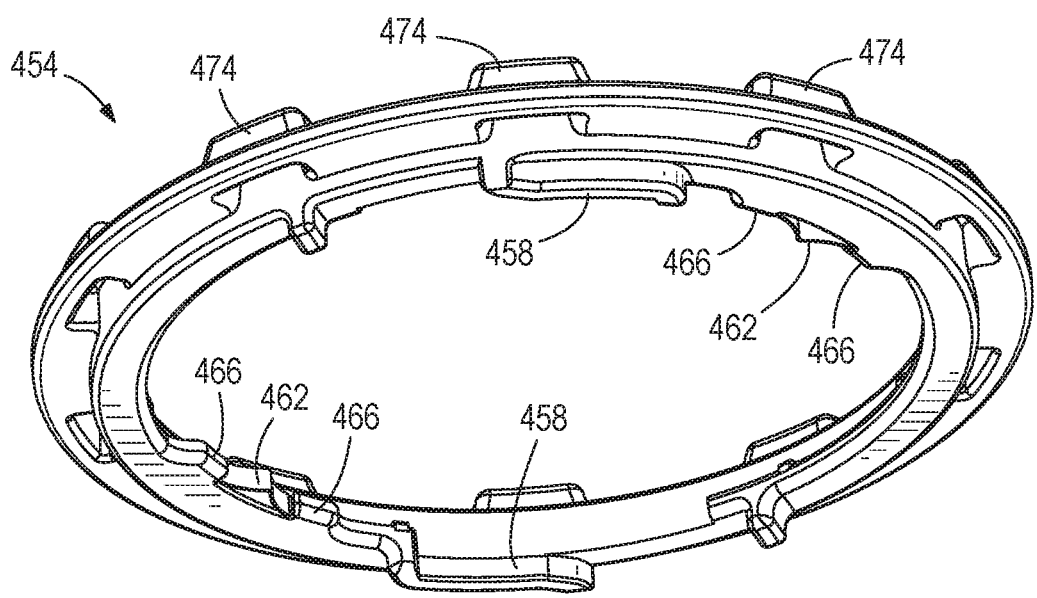
FIG. 32 is a perspective view of a lock ring of the die holder of FIG. 29.

As shown in FIGS. 29, 30 and 32, the die holder 390 also includes a lock ring 454 that is rotatable relative to the gear member 392, as explained below. As shown in FIGS. 30 and 32, the lock ring 454 includes a pair of axially extending contact surfaces 458 and a pair of detent members, such as leaf springs 462, that are each arranged between a pair of radially inward extending ledges 466. The ledges 466 are set underneath a retaining ring 470 (FIG. 29) fastened to the gear member 392, thus axially constraining the lock ring 454 on the gear member 392.

The lock ring 454 also includes a plurality of fins 474 (FIG. 32), permitting an operator to rotate the lock ring 454 with respect to the gear member 392. Specifically, the lock ring 454 is rotatable between a locked position (FIG. 30), in which the contact surfaces 458 are respectively arranged behind the shoulders 436 of the torque keys 414 and the leaf springs 462 are arranged in the first detent recesses 446, and an unlocked position, in which the contact surfaces 458 are rotated away from the shoulders 436 of the torque keys 414, such that the contact surfaces 458 do not radially overlap the shoulders 436, and the leaf springs 462 are arranged in the second detent recesses 450.

In operation, before inserting the die 34 into the die holder 390, the operator must first ensure that the lock ring 454 is in the unlocked position. If the lock ring 454 is in the locked position and the operator attempts to insert the die 34, when the curvilinear edge 230 of the die 34 begins pressing against the key portions 422 of the respective keys 414, the keys 414 will be inhibited from moving away from the rotational axis 32 because the shoulders 436 are abutted against the contact surfaces 458 of the lock ring 454. Thus, the operator will be unable to insert the die 34 into the die holder 390.

In order to permit insertion of the die 34, the operator rotates the lock ring 454 from the locked position to the unlocked position, counterclockwise as viewed in FIGS. 29 and 30, causing the contact surfaces 458 to be rotated away from the shoulders 436 of the torque keys 414, such that the contact surfaces 458 do not radially overlap the shoulders 436, and the leaf springs 462 to be arranged in the second detent recesses 450. The operator then inserts the die 34 into the die holder 390 along the rotational axis 32, causing the curvilinear edge 230 of the die 34 to begin pressing against the key portions 422 of the respective keys 414, thus forcing the keys 414 away from the rotational axis 32 against the biasing force of springs 410. As the operator continues inserting the die 34, the cylindrical portion 342 of the die 34 comes into contact with the nose 430 of the key portion 422, displacing the keys 414 completely within the key recesses 406. Once the recessed portion 234 of the die 34 has become aligned with the key recesses 406 along the rotational axis 32, the keys 414 rebound due to the biasing force of springs 410 into respective recesses 238.

Once the die 34 has been inserted into the die holder 390, and before operating the pipe threader 10, an operator rotates the lock ring 454 from the unlocked position back to the locked position, causing the contact surfaces 458 to be moved behind the shoulders 436 of the torque keys 414, such that the contact surfaces 458 radially overlap the shoulders 436, and the leaf springs 462 to be arranged in the first detent recesses 446. Once the lock ring 454 is in the locked position, inadvertent removal of the die 34 from the die holder 390 is inhibited. Specifically, during operation, even if the die 34 experiences a force tending to push or pull the die 34 along the rotational axis 32 with respect to the die holder 390, the torque keys 414 will be inhibited from moving away from the rotational axis 32 because the shoulders 436 abut against the contact surfaces 458 of the lock ring 454, and thus the torque keys 414 are inhibited from exiting the recesses 238 of the die 34.

Once the lock ring 454 is moved to the locked position while the die 34 is in the die holder 390, the operator then arranges the die 34 on a pipe to be threaded and presses against the face 38 of the non-rotating projection 36 of FIG. 1, or projection 40 of the die 34, in the direction of the rotational axis 32. The operator then presses trigger 50 to activate motor 22, which transfers torque through the transmission 26 to the output gear 50, thus causing the die holder 30 to begin rotating. As the die holder 30 rotates, torque is transferred from the die holder 390, through the torque keys 414, and to the die 34 via the side faces 434 of the key portions 422 of the torque keys 414 being arranged in the recesses 238, thus causing the die 34 to rotate. Because of the application of force against projection 36 or 40, the die 34 begins moving along the pipe to cut threads on the pipe. Once the pipe-threading operation has been completed, the operator may remove the die 34 from the pipe.

Before removing the die 34 from the die holder 390, the operator must first rotate the lock ring 454 to the unlocked position, thus rotating the contact surfaces 458 away from the shoulders 436 of the torque keys 414. The operator then removes the die 34 from the die holder 390 by pulling the die 34 from the die holder 390 in a direction opposite of which it was inserted. As the die 34 is removed, the cylindrical portion 342 of the die 34 slides along the edges 426 of the key portions 422, thus forcing the keys 414 away from the rotational axis 32 and into the key recesses 406, thereby unlocking the die 34 from the die holder 390.

Various features of the invention are set forth in the following claims.

What is claimed is:

1. A pipe threader configured to rotate a die, the pipe threader comprising:
   a housing;
   a drive assembly including a motor and an output gear having a first plurality of teeth, the output gear receiving torque from the motor; and
   a die holder defining a rotational axis, the die holder including
      a gear member including
         an outer circumference with a second plurality of teeth engaged with the first plurality teeth of the output gear, such that the die holder is rotatable in response to receiving torque from the output gear, and
         an inner circumference with a key recess,
      a lock ring rotatable relative to the gear member and including a contact surface,
      a key arranged in the key recess, and
      a biasing member in the key recess biasing the key toward the rotational axis,
   wherein the lock ring is movable between a locked position, in which the contact surface inhibits the key from moving away from the rotational axis, and an unlocked position, in which the key is movable away from the rotational axis in response to insertion of the die into the die holder along the rotational axis.

2. The pipe threader of claim 1, wherein the gear member includes a first detent recess and a second detent recess, wherein the lock ring includes a detent member, and wherein when the lock ring is in the locked positon, the detent member is in the first detent recess, and when the lock ring is in the unlocked position, the detent member is in the second detent recess.

3. The pipe threader of claim 2, wherein the detent member is leaf spring.

4. The pipe threader of claim 3, wherein the leaf spring is arranged between two radially inward extending ledges on the lock ring.

5. The pipe threader of claim 1, wherein the key recess is one of a plurality of key recesses defined in the inner circumference of the gear member, and wherein the biasing member and the key are one of a plurality of biasing members and keys arranged respectively within the plurality of key recesses.

6. The pipe threader of claim 1, further comprising a retaining ring coupled to the gear member and axially constraining the lock ring on the gear member.

7. The pipe threader of claim 1, further comprising a plurality of fins on the lock ring, such that a user may grasp the fins to rotate the lock ring between the locked and unlocked positions.

8. The pipe threader of claim 1, wherein, when the lock ring is in the unlocked position and the die is inserted into the die holder along the rotational axis, the key is biased into a die recess in the die, such that torque is transferable from the die holder to the die through the key, causing the die to rotate with the die holder.

9. The pipe threader of claim 8, wherein the key includes a body and a key portion extending radially inward from the body, and wherein, when the lock ring is in the unlocked position and the die is inserted into the die holder along the rotational axis, the key portion is receivable into the die recess in the die.

10. The pipe threader of claim 9, wherein the key portion includes two edges obliquely oriented with respect to the rotational axis.

11. The pipe threader of claim 10, wherein the key portion includes a flat nose between the two edges.

12. The pipe threader of claim 11, wherein the key portion includes two opposite side faces for transferring torque from the die holder, through the key, and to the die.

13. The pipe threader of claim 9, wherein the key includes a spring recess on a side of the body opposite the key portion, and wherein the biasing member is a compression spring that is received in the recess.

14. The pipe threader of claim 9, wherein the key includes a shoulder extending radially outward from the body, the shoulder configured to abut the contact surface in response to the key being moved away from the rotational axis when the lock ring is in the locked position.

15. The pipe threader of claim 14, wherein the key includes a pair of wings extending outward from the body, wherein the gear member includes a pair of ledges adjacent the key recess, and wherein the wings are biased against the ledges by the biasing member, such that the key is maintained within the key recess.

16. A pipe threader configured to rotate a die, the pipe threader comprising:
   a housing;
   a drive assembly including a motor and an output gear having a first plurality of teeth, the output gear receiving torque from the motor; and
   a die holder defining a rotational axis, the die holder including
      a gear member including
         an outer circumference with a second plurality of teeth engaged with the first plurality teeth of the output gear, such that the die holder is rotatable in response to receiving torque from the output gear,
         an inner circumference with a first key recess and a second key recess,
         a pair of first detent recesses, and
         a pair of second detent recesses,
      a lock ring rotatable relative to the gear member and including a first contact surface, a second contact surface, and a pair of detent members,
      a first key arranged in the first key recess and a second key arranged in the second key recess,
      a first biasing member in the first key recess biasing the first key toward the rotational axis, and a second biasing member in the second key recess biasing the second key toward the rotational axis, wherein the lock ring is movable between a locked position, in which the detent members are respectively arranged in the first detent recesses, and the first and second contact surfaces respectively inhibit the first and second keys from moving away from the rotational axis, and an unlocked position, in which the detent members are respectively arranged in the second detent recesses, and the first and second keys are movable away from the rotational axis in response to insertion of the die into the die holder along the rotational axis.

17. The pipe threader of claim 16, wherein the first and second key recesses are arranged opposite each other on the gear member.

18. The pipe threader of claim 17, wherein the first detent recesses are arranged opposite each other on the gear member, and wherein second detent recesses are arranged opposite each other on the gear member.

19. A pipe threader configured to rotate a die, the pipe threader comprising:
   a housing;
   a drive assembly including a motor and an output gear having a first plurality of teeth, the output gear receiving torque from the motor; and
   a die holder defining a rotational axis, the die holder including
      a gear member including
         an outer circumference with a second plurality of teeth engaged with the first plurality teeth of the output gear, such that the die holder is rotatable in response to receiving torque from the output gear, and
         an inner circumference with a key recess,
      a lock ring rotatable relative to the gear member and including a contact surface,
      a key arranged in the key recess, the key including
         a body including a spring recess, and
         a key portion extending radially inward from the body, the key portion including
            two edges obliquely oriented with respect to the rotational axis,
            a flat nose between the two edges, and
            two opposite side faces for transferring torque from the die holder to the die through the key, and
      a compression spring in the key recess and received in the spring recess, such that the key is biased toward the rotational axis, wherein the lock ring is movable between a locked position, in which the contact surface of the lock ring inhibits the key from moving away from the rotational axis, and an unlocked position, in which the key is movable away from the rotational axis in response to insertion of the die into the die holder along the rotational axis, and wherein, when the lock ring is in the unlocked position and the die is inserted into the die holder along the rotational axis, the key is biased into a recess in the die, such that torque is transferable from the die holder through one of the side faces of the key portion to the die, causing the die to rotate with the die holder.

20. The pipe threader of claim 19, wherein the key includes a shoulder extending radially outward from the body, the shoulder configured to abut the contact surface of the lock ring in response to the key being moved away from the rotational axis when the lock ring is in the locked position, and wherein the key includes a pair of wings extending outward from the body, wherein the gear member includes a pair of ledges adjacent the key recess, and wherein the wings are biased against the ledges by the biasing member, such that the key is maintained within the key recess.

\* \* \* \* \*